United States Patent
Okisu et al.

(10) Patent No.: US 7,184,078 B2
(45) Date of Patent: Feb. 27, 2007

(54) IMAGE-PROCESSING APPARATUS AND IMAGE-QUALITY CONTROL METHOD

(75) Inventors: Noriyuki Okisu, Osakasayama (JP); Jun Minakuti, Sakai (JP); Ayumi Itoh, Ikoma-Gun (JP); Motohiro Nakanishi, Kobe (JP)

(73) Assignee: Minolta Co., Ltd., Osaka (JP)

( * ) Notice: Subject to any disclaimer, the term of this patent is extended or adjusted under 35 U.S.C. 154(b) by 797 days.

(21) Appl. No.: 10/186,077

(22) Filed: Jun. 28, 2002

(65) Prior Publication Data
US 2003/0007076 A1  Jan. 9, 2003

(30) Foreign Application Priority Data
Jul. 2, 2001  (JP) ............................... 2001-200933

(51) Int. Cl.
H04N 5/235  (2006.01)
(52) U.S. Cl. ............................... 348/222.1; 348/229.1; 348/231.3
(58) Field of Classification Search ............. 348/222.1, 348/207.99, 229.1, 370, 371, 231.3
See application file for complete search history.

(56) References Cited

U.S. PATENT DOCUMENTS

| 4,456,931 | A | * | 6/1984 | Toyoda et al. ............... 386/118 |
| 5,119,178 | A | * | 6/1992 | Sakata et al. ............. 348/223.1 |
| 5,602,412 | A | * | 2/1997 | Suzuki et al. ................ 257/432 |
| 5,883,666 | A | | 3/1999 | Kyuma et al. |
| 2002/0130959 | A1 | * | 9/2002 | McGarvey ................... 348/223 |

* cited by examiner

*Primary Examiner*—Tuan Ho
(74) *Attorney, Agent, or Firm*—Sidley Austin LLP

(57) ABSTRACT

A digital camera is provided with a plurality of image-pickup modes to carry out an optimal controlling process in accordance with an image-pickup scene. With respect to mode selection settings, a switching can be made between a manual selection setting in which the user manually selects an image-pickup mode and an automatic selection setting which automatically discriminates each image-pickup scene, and selects a suitable image-pickup mode. In the case of the automatic selection setting in the mode selection setting, a limited value in comparison with a parameter value relating to the image quality set at the time of the manual selection setting is set as the parameter. As a result, even in the case of a misdiscrimination in an image-pickup scene, it is possible to provide a flawless image as the resulting image, and consequently to prevent serious degradation in the image quality.

8 Claims, 17 Drawing Sheets

FIG. 16

| IMAGE-PICKUP MODE | APERTURE VALUE AND SHUTTER SPEED | | FLASH LIGHT EMISSION | |
|---|---|---|---|---|
| | MANUAL SELECTION SETTING | AUTOMATIC SELECTION SETTING | MANUAL SELECTION SETTING | AUTOMATIC SELECTION SETTING |
| STANDARD | STANDARD PROGRAM | STANDARD PROGRAM | AUTOMATIC FLASH AT NOT MORE THAN BvH | AUTOMATIC FLASH AT NOT MORE THAN BvH |
| PORTRAIT | DIAPHRAGM PREFERENCE (F2.8) | DIAPHRAGM PREFERENCE (F4) | AUTOMATIC FLASH AT NOT MORE THAN BvH-2 | AUTOMATIC FLASH AT NOT MORE THAN BvH-1 |
| SPORTS ACTION | SHUTTER SPEED PREFERENCE (1/500 SECOND) | SHUTTER SPEED PREFERENCE (1/250 SECOND) | AUTOMATIC FLASH AT NOT MORE THAN BvH | AUTOMATIC FLASH AT NOT MORE THAN BvH |
| LANDSCAPE | DIAPHRAGM PREFERENCE (F16) | DIAPHRAGM PREFERENCE (F11) | AUTOMATIC FLASH AT NOT MORE THAN BvH | AUTOMATIC FLASH AT NOT MORE THAN BvH |
| SUNSET | DIAPHRAGM PREFERENCE (F2.8) MINIMUM SS LIMITLESS | DIAPHRAGM PREFERENCE (F2.8) MINIMUM LIMITED TO SS1/8 | FLASH INHIBITION | FLASH INHIBITION |
| NIGHT PORTRAIT | DIAPHRAGM PREFERENCE (F2.8) MINIMUM SS LIMITLESS | DIAPHRAGM PREFERENCE (F2.8) MINIMUM LIMITED TO SS1/8 | FLASH INHIBITION | FLASH INHIBITION |

FIG. 17

| IMAGE-PICKUP MODE | WHITE BALANCE CORRECTION | | γ CORRECTION | |
|---|---|---|---|---|
| | MANUAL SELECTION SETTING | AUTOMATIC SELECTION SETTING | MANUAL SELECTION SETTING | AUTOMATIC SELECTION SETTING |
| STANDARD | AUTO | AUTO | γ CORRECTION TABLE LUT3 | γ CORRECTION TABLE LUT3 |
| PORTRAIT | AUTO | AUTO | γ CORRECTION TABLE LUT5 | γ CORRECTION TABLE LUT4 |
| SPORTS ACTION | AUTO | AUTO | γ CORRECTION TABLE LUT1 | γ CORRECTION TABLE LUT2 |
| LANDSCAPE | AUTO | AUTO | γ CORRECTION TABLE LUT3 | γ CORRECTION TABLE LUT3 |
| SUNSET | FIXED TO DAYLIGHT | AVERAGE OF DAYLIGHT AND AUTO | γ CORRECTION TABLE LUT3 | γ CORRECTION TABLE LUT3 |
| NIGHT PORTRAIT | FIXED TO DAYLIGHT | AVERAGE OF DAYLIGHT AND AUTO | γ CORRECTION TABLE LUT3 | γ CORRECTION TABLE LUT3 |

FIG. 18

| SCENE | COLOR CORRECTION | | SHARPNESS | | CORING | |
|---|---|---|---|---|---|---|
| | MANUAL SELECTION SETTING | AUTOMATIC SELECTION SETTING | MANUAL SELECTION SETTING | AUTOMATIC SELECTION SETTING | MANUAL SELECTION SETTING | AUTOMATIC SELECTION SETTING |
| STANDARD | MATRIX M1 | MATRIX M1 | GAIN = 1 | GAIN = 1 | CORING AMOUNT Ca | CORING AMOUNT Ca |
| PORTRAIT | MATRIX M1 | MATRIX M1 | GAIN = 0.8 | GAIN = 0.9 | CORING AMOUNT Ca | CORING AMOUNT Ca |
| SPORTS ACTION | MATRIX M1 | MATRIX M1 | GAIN = 1.2 | GAIN = 1.1 | CORING AMOUNT Ca | CORING AMOUNT Ca |
| LANDSCAPE | MATRIX M3 | MATRIX M2 | GAIN = 1.2 | GAIN = 1.1 | CORING AMOUNT Ca | CORING AMOUNT Ca |
| SUNSET | MATRIX M3 | MATRIX M2 | GAIN = 1 | GAIN = 1 | CORING AMOUNT Ca | CORING AMOUNT Ca |
| NIGHT PORTRAIT | MATRIX M1 | MATRIX M1 | GAIN = 1 | GAIN = 1 | CORING AMOUNT Cc | CORING AMOUNT Cb |

53

IMAGE-PROCESSING APPARATUS AND IMAGE-QUALITY CONTROL METHOD

This application is based on application No. 2001-200933 filed in Japan, the contents of which are hereby incorporated by reference.

BACKGROUND OF THE INVENTION

1. Field of the Invention

The present invention relates to a technique for carrying out processes relating to image quality of images.

2. Description of the Background Art

As one example of conventional image-processing apparatus, an image-pickup apparatus, such as a digital still camera (hereinafter, referred to as "digital camera") and a film camera, which carries out a controlling operation that is best-suited for an image-pickup scene by allowing the user to select an image-pickup mode in accordance with the image-pickup scene, has been known. The user is allowed to select one image-pickup mode from a plurality of image-pickup modes, such as "portrait", "sports action", "landscape" and "night portrait" modes, in accordance with the purpose thereof, to obtain an image that is suitable for the image-pickup scene.

With respect to each of the image-pickup modes, parameters relating to exposure controls, such as the diaphragm of a lens system, shutter speed, and flash light emission, have been preliminarily set, and the image-pickup apparatus carries out controlling operations in accordance with these parameters. For example, in the image-pickup mode suitable for a portrait scene, parameters such as setting of the diaphragm on the opening side are set. The setting of the diaphragm on the opening side makes the depth of field shallower to obtain an image with only the main subject (person) being beautifully distinguished while the background is faded.

Moreover, with respect to digital image-pickup apparatuses such as digital cameras, since it is possible to carry out image processing on a picked-up image, parameters relating to image processing such as white balance correction and γ correction are also set in the image-pickup modes in addition to the above-mentioned exposure controlling parameters. Thus, it becomes possible to carry out best-suited image processing in accordance with an image-pickup scene, and consequently to provide a more effective image.

However, in the above-mentioned image-pickup apparatuses, the user needs to determine an image-pickup scene and to select any one of the image-pickup modes, resulting in time-consuming difficult operations and a failure to deal with an instantaneous shutter chance. For this reason, most of scenes tend to be picked up in the standard image-pickup mode, and in most cases, prepared functions are not sufficiently utilized.

In order to solve this problem, an image-pickup apparatus which discriminates image-pickup scenes and automatically selects a best-suited image-pickup mode has been proposed. When set to an automatic selection setting that automatically selects an image-pickup mode, such an image-pickup apparatus makes it possible to easily obtain an image suitable for the corresponding image-pickup scene without the necessity of troublesome operations. However, since the discrimination is automatically made, there is a possibility of misdiscrimination in an image-pickup scene, and if an image-pickup operation is carried out under misdiscrimination, it is not possible to carry out an appropriate image-pickup control suitable for an image-pickup scene. In particular, in the case when a certain scene is misdiscriminated to an image-pickup scene that aims at an opposite effect, the resulting image is subjected to adverse effects and serious degradation in the image quality.

SUMMARY OF THE INVENTION

The present invention is directed to an image-processing apparatus which carries out processes relating to image quality of images.

In accordance with the present invention, the image-processing apparatus comprises: a determining part which, with respect to a mode selection setting at the time of an image-pickup process on an image, determines whether the mode selection setting is a manual selection setting in which an image-pickup mode is specified from a plurality of image-pickup modes in accordance with an image-pickup scene by a user or an automatic selection setting in which an image-pickup mode is automatically selected from the plurality of image-pickup modes by automatic discrimination of the image-pickup scene; and a parameter setting part that sets a parameter relating to image quality of the image in different manners depending on cases in which the mode selection setting is determined as the manual selection setting and in which the mode selection setting is determined as the automatic selection setting.

Thus, it becomes possible to provide different image qualities between an image obtained from the process based upon the manual selection setting and an image obtained from the process based upon the automatic selection setting so that, in the case of the automatic selection setting, it is possible to set parameter values not to cause serious degradation in the image quality without being regulated by the contents of the manual selection setting.

In one aspect of the present invention, the image-processing apparatus further comprises: a memory part for storing a reference value of the parameter and an optimal value of the parameter in accordance with the image-pickup mode, wherein the parameter setting part sets the parameter to the optimal value in the manual selection setting, and also sets the parameter to a value between the optimal value and the reference value in the automatic selection setting.

Since the manual selection setting sets the parameter to an optimal value, it is possible to obtain an image suitable for the corresponding image-pickup scene. In addition thereto, in the automatic selection setting, the parameter is set between the optimal value and the reference value so that it is possible to provide a flawless image, and consequently to prevent degradation in the image quality due to misdiscrimination of an image-pickup scene.

In accordance with another aspect of the present invention, the image-processing apparatus further comprises: an image-pickup part for acquiring the image, wherein the parameter includes an exposure control parameter relating to exposure control at the time of the image-pickup process of the image.

By making the exposure control parameters different from each other, it is possible to differentiate the image quality relating to exposure between an image obtained as a result of the process in the manual selection setting and an image obtained as a result of the process in the automatic selection setting.

In accordance with still another aspect of the present invention, the parameter includes an image-processing control parameter relating to control of an image-process on the image.

By making the image-processing parameters different from each other, it is possible to differentiate the image quality by using image processes between an image obtained as a result of the process in the manual selection setting and an image obtained as a result of the process in the automatic selection setting.

Further, the present invention is also directed to a method of controlling image quality of an image.

Moreover, the present invention is also directed to a program for executing an image processing.

Furthermore, the present invention is also directed to a computer-readable recording medium storing a program for executing an image processing.

It is therefore an object of the present invention to provide a technique that can prevent serious degradation in the image quality of an image that is obtained at the time of the automatic selection setting in the image-pickup mode.

These and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a drawing that shows one example of an exposure control table.

FIGS. 17 and 18 are drawings that show one example of an image processing control table.

DESCRIPTION OF THE PREFERRED EMBODIMENTS

Referring to Figures, the following description will discuss preferred embodiments of the present invention.

<1. Construction of a Digital Camera>

Figure 1:
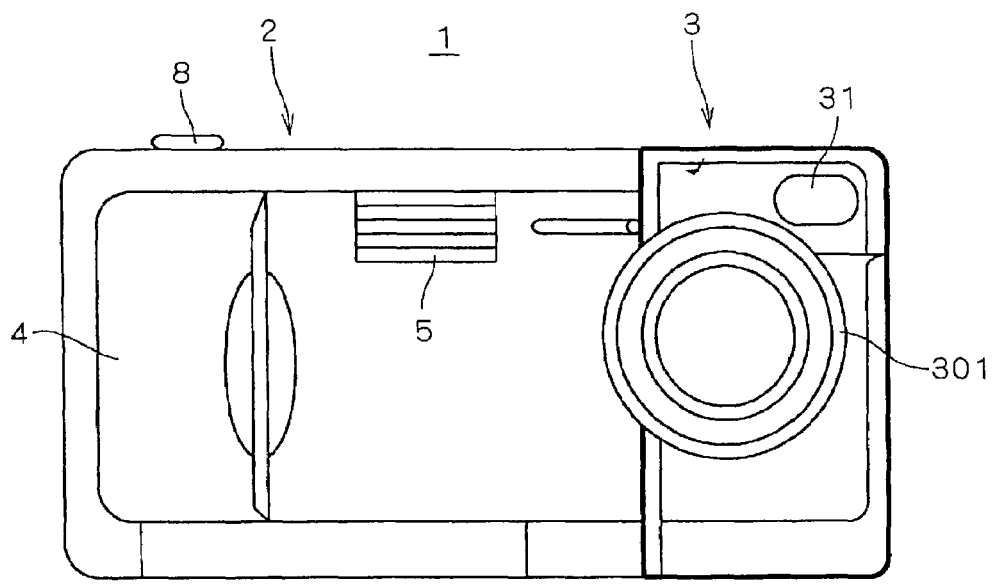
FIG. 1 is a front view of a digital camera serving as an image processing apparatus in a preferred embodiment.
Figure 2:
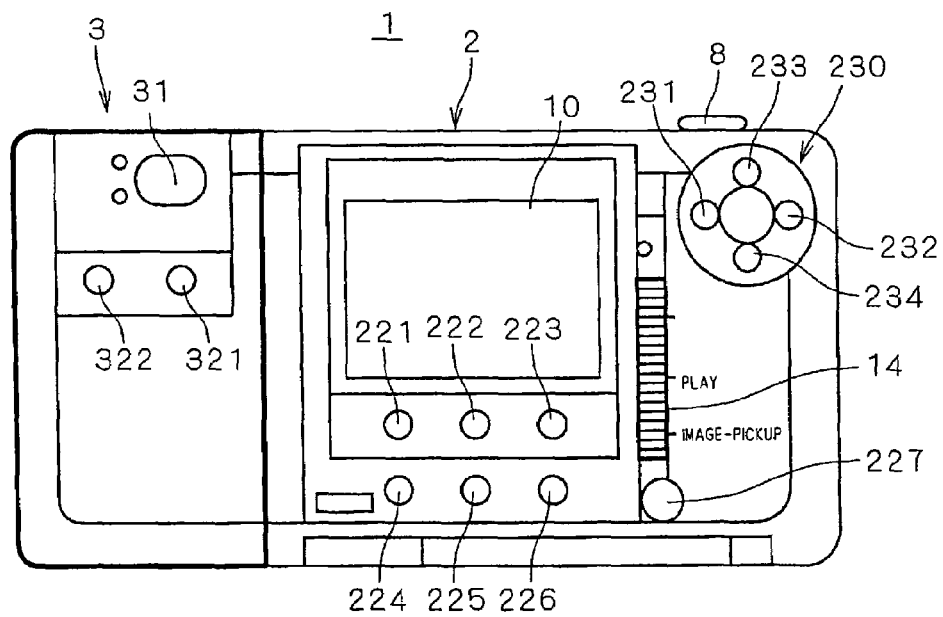
FIG. 2 is a rear-face view of the digital camera.
Figure 3:
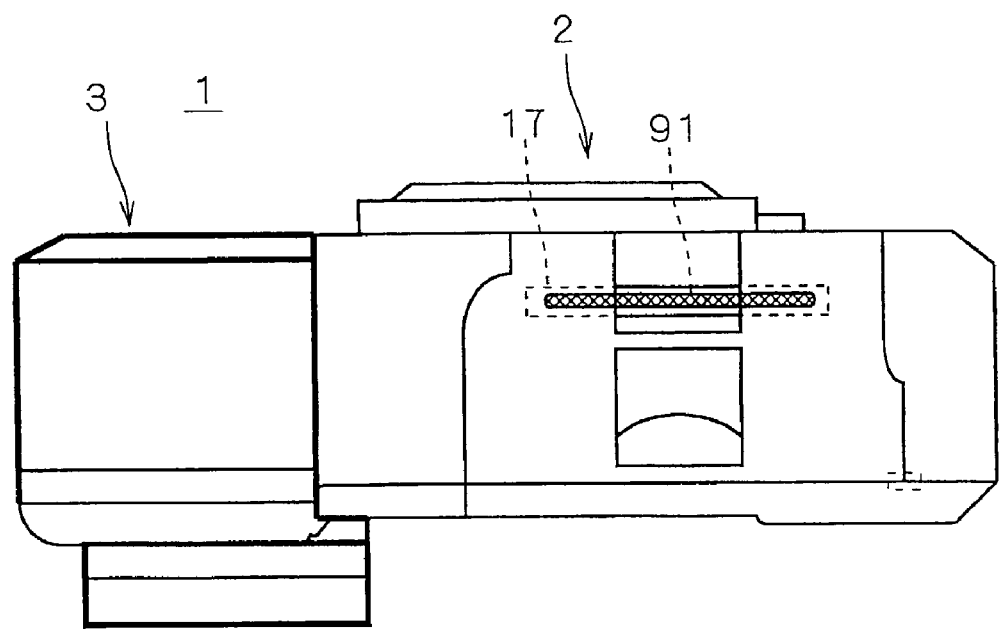
FIG. 3 is a bottom-face view of the digital camera.

FIGS. 1 to 3 show one example of an external construction of a digital camera 1 that is an image processing apparatus which acquires an image as digital data. FIG. 1 is a front view, FIG. 2 is a rear-face view, and FIG. 3 is a bottom-face view. As shown in FIG. 1, the digital camera 1 is constituted by a camera main body part 2 having a box shape and an image pickup part 3 having a rectangular parallelepiped shape.

A zoom lens 301, which has a macro function and serves as an image-pickup lens, and an optical finder 31 are placed on the front face side of the image pickup part 3. Further, a grip part 4 is placed on the left end portion on the front face side of the camera main body part 2, a built-in flash 5 is placed on the upper center portion thereof, and a shutter button 8 is placed on the upper face side thereof.

Here, as shown in FIG. 2, on the rear-face side of the camera main body part 2 are installed a liquid crystal display (LCD) 10 (corresponding to an electronic viewfinder) which monitor-displays a picked-up image in the substantially center thereof, and reproduces recorded images. Moreover, a group of key switches 221 to 226 and a power-supply switch 227 are placed below the LCD 10.

An operation switch 14 for switching operation modes of the camera between "image-pickup" and "play" is placed on the rear-face side of the camera main body part 2. When the operation mode is set to "image-pickup", the camera is allowed to carry out an image-pickup operation to generate an image of a subject, and when the operation mode is set to "play", images recorded in a memory card are read, and displayed on the LCD 10. The operation switch 14 is a slide switch having two contact points, and when this is slid to the lower position, the operation mode is set to "image-pickup", while, when this is slid to the upper position, the operation mode is set to "play".

Moreover, a quadruple switch 230 is placed on the right side of the camera rear face so as to allow various operations. For example, in the case of "image-pickup" in the operation mode, the zooming magnification is changed by pressing buttons 231, 232.

As shown in FIG. 2, a mode selection setting switch 322 for switching mode selection setting is placed on the rear-face of the image-pickup part 3 together with an LCD button 321 for turning on/off the LCD 10. By pressing the mode selection setting switch 322, the mode selection setting can be switched between a manual selection setting in which image-pickup modes are specified by the user to be manually selected and an automatic selection setting in which image-pickup modes are automatically selected by automatic discrimination of image-pickup scenes.

With respect to the image-pickup modes of the digital camera 1 of the present preferred embodiment, six types of modes, that is, "portrait", "sports action", "landscape", "sunset" and "night portrait" are prepared in accordance with image-pickup scenes, in addition to "standard" for carrying out standard operations; thus, it is possible to obtain an image suitable for the corresponding image-pickup scene. For example, in "portrait", a controlling operation is made such that an image in which skin of the subject (person) is smoothly represented is provided; thus, it is possible to obtain an image that makes the person conspicuous beautifully. In "sports action", it is possible to obtain an image that seizes an instantaneous motion of a subject, and vividly represents the subject. In "landscape", it is possible to obtain a clear image in which both of persons and the background are well focused. In "sunset", it is possible to obtain an image that properly represents a dusk atmosphere with red color remaining therein. In "night portrait", it is possible to obtain an image that clearly reproduces colors given by light-sources, and the like. Moreover, in "standard", standard controlling operations are carried out without limitations in image-pickup scenes. With respect to the contents of these controlling operations, explanations thereof will be given in detail later.

At the time of the manual selection setting, one image-pickup mode is selected from the plurality of image-pickup modes by an operation given through the group of key switches 221 to 226. In contrast, at the time of the automatic selection setting, an image-pickup scene is automatically discriminated, and one image-pickup mode is automatically selected from a plurality of image-pickup modes.

As shown in FIG. 3, a card slot 17 is provided in the bottom face of the camera main body part 2. This card slot 17 accepts a memory card 91 and the like which records picked-up images or the like, and is detachably attached thereto.

<2. Inner Construction of Digital Camera>

Figure 4:
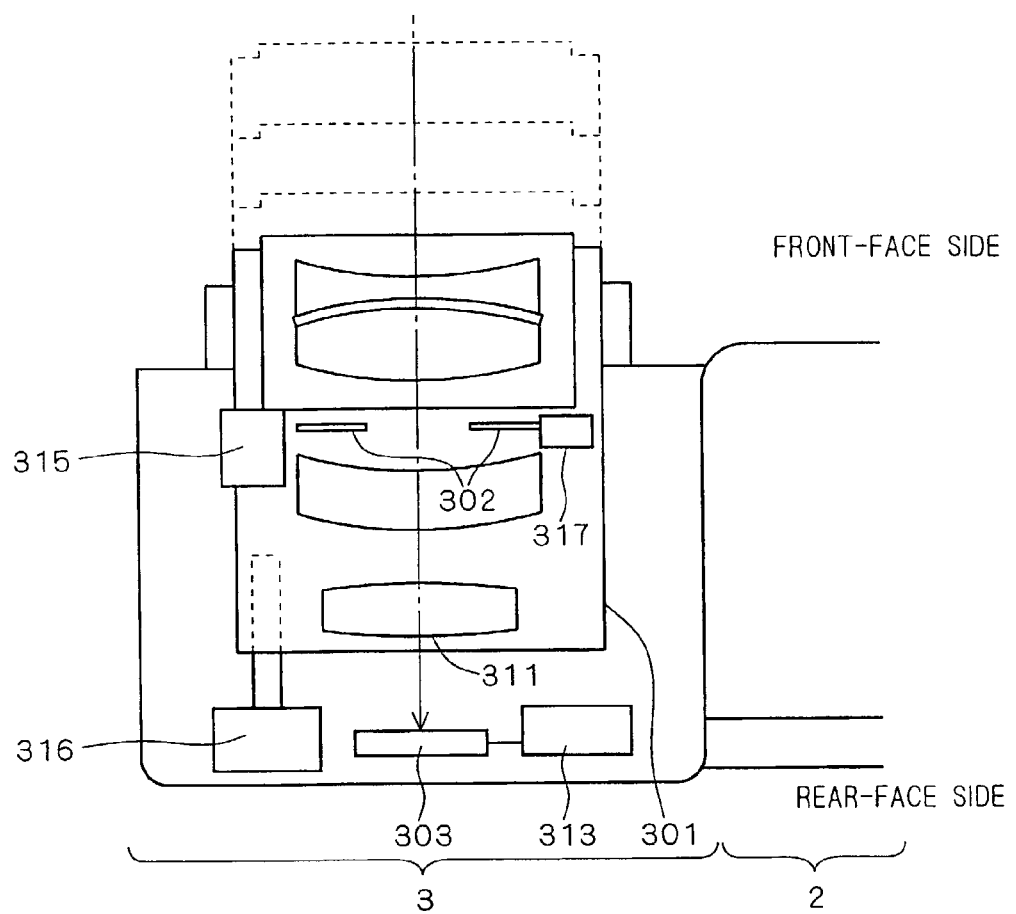
FIG. 4 is a drawing that shows a schematic layout of respective parts in an image pickup part.

The following description will discuss an inner construction of digital camera 1. FIG. 4 is a drawing that shows a schematic layout of respective parts in the image-pickup part 3. Moreover, FIG. 5 is a block diagram that shows a construction of the digital camera 1.

As shown in FIG. 4, an image-pickup circuit having a CCD 303 is located at a proper place on the rear position of the zoom lens 301 in the image-pickup part 3. Moreover, inside the image-pickup part 3, a zoom motor 315 for altering the zooming magnification of the zoom lens 301 and for shifting lenses between the housing position and the image-pickup position, a focus motor 316 for shifting a focus lens 311 within the zoom lens 301 in order to carry out an automatic focusing operation and a diaphragm motor 317 for adjusting the aperture diameter of a diaphragm 302 installed inside the zoom lens 301 are placed.

Figure 5:
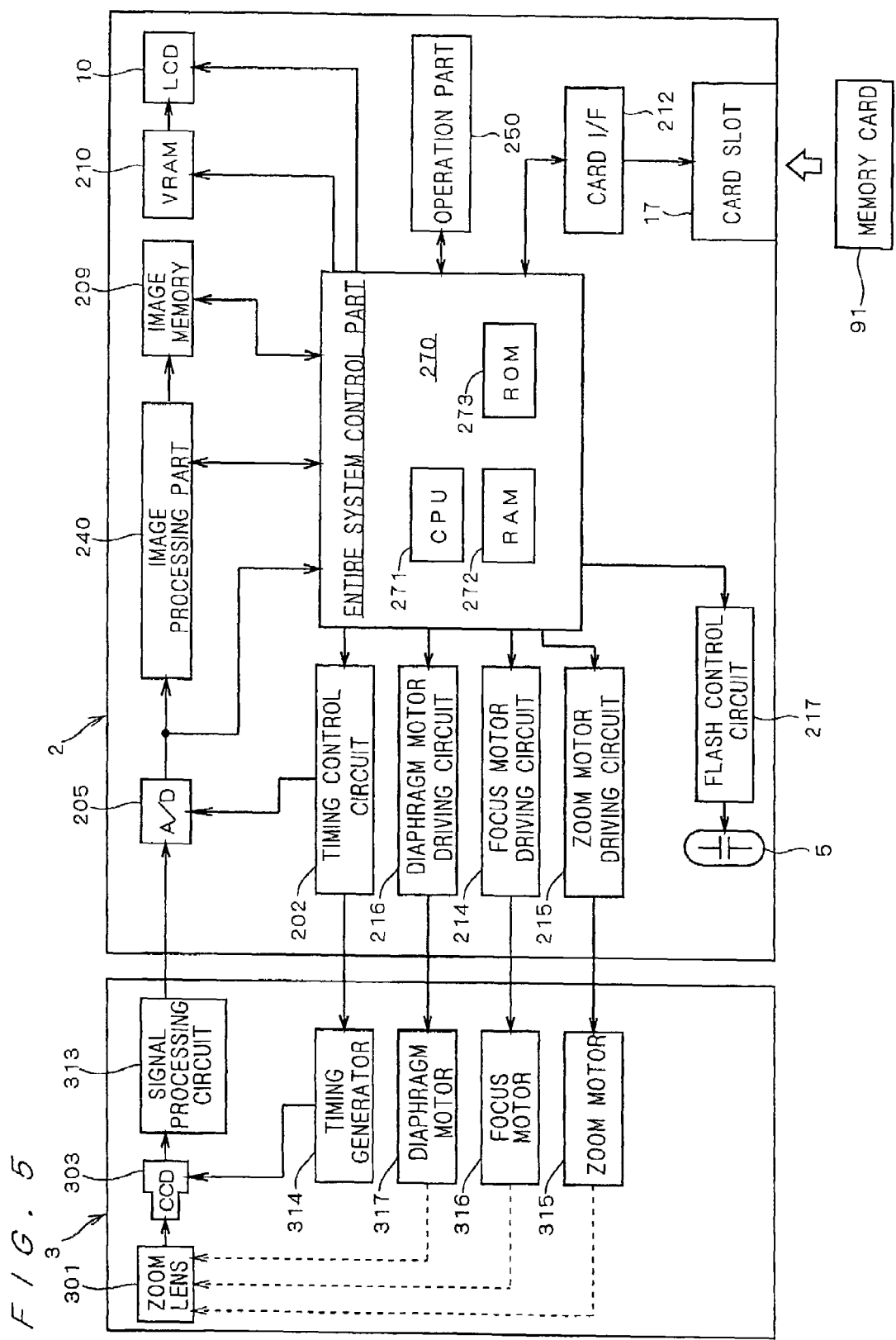
FIG. 5 is a block diagram that shows a construction of the digital camera.

As shown in FIG. 5, zoom motor 315, focus motor 316 and diaphragm motor 317 are respectively driven by a zoom motor driving circuit 215, a focus motor driving circuit 214 and a diaphragm motor driving circuit 216 that are installed in the camera main body part 2. Moreover, the respective driving circuits 214 to 216 drive the respective motors 315 to 317 based upon control signals given from an entire system control part 270 of the camera main body part 2.

Here, the CCD 303 photo-electric converts a light image of a subject converged by the zoom lens 301 to image signals (signals consisting of signal trains of pixel signals received by the respective pixels) having color components of R(red), G(green) and B(blue), and outputs the resulting signals.

A timing generator 314 generates driving control signals of the CCD 303 based upon a reference clock transmitted from a timing control circuit 202 of the camera main body part 2. The timing generator 314 generates clock signals such as a timing signal of integration start/end (exposure start/end) and reading control signals for a light-receiving signal of each pixel (horizontal synchronous signal, vertical synchronous signal, transfer signal, etc.), and outputs these to the CCD 303.

A signal processing circuit 313 carries out a predetermined analog signal processing on an image signal (analog signal) outputted from the CCD 303. The signal processing circuit 313, which has a CDS (correlative double sampling) circuit and an AGC (auto gain control) circuit, reduces noise from an image signal by using the CDS circuit, and adjusts the level of the image signal by adjusting the gain using the AGC circuit.

The following description will discuss blocks of the camera main body part 2.

Inside the camera main body part 2, an A/D converter 205 converts a signal of each pixel of an image to a digital signal of, for example, 12 bits (A/D conversion). This A/D converter 205 converts respective pixel signals (analog signals) into digital signals based upon an A/D conversion-use reference clock inputted from timing control circuit 202.

The timing control circuit 202 is designed to generate a reference clock for the timing generator 314 and the A/D converter 205. This timing control circuit 202 is controlled by the entire system control part 270.

Digital signals, converted by the A/D converter 205, are respectively inputted to an image-processing part 240 and entire system control part 270. The digital signals inputted to the image-processing part 240 are subjected to various image processes in the image-processing part 240, and stored in the memory card 91, or utilized as live-view display images. The digital signals inputted to the entire system control part 270 are utilized so that the entire system control part 270 can calculate luminance, color balance, contrast, etc. of incident light from a subject.

Figure 6:
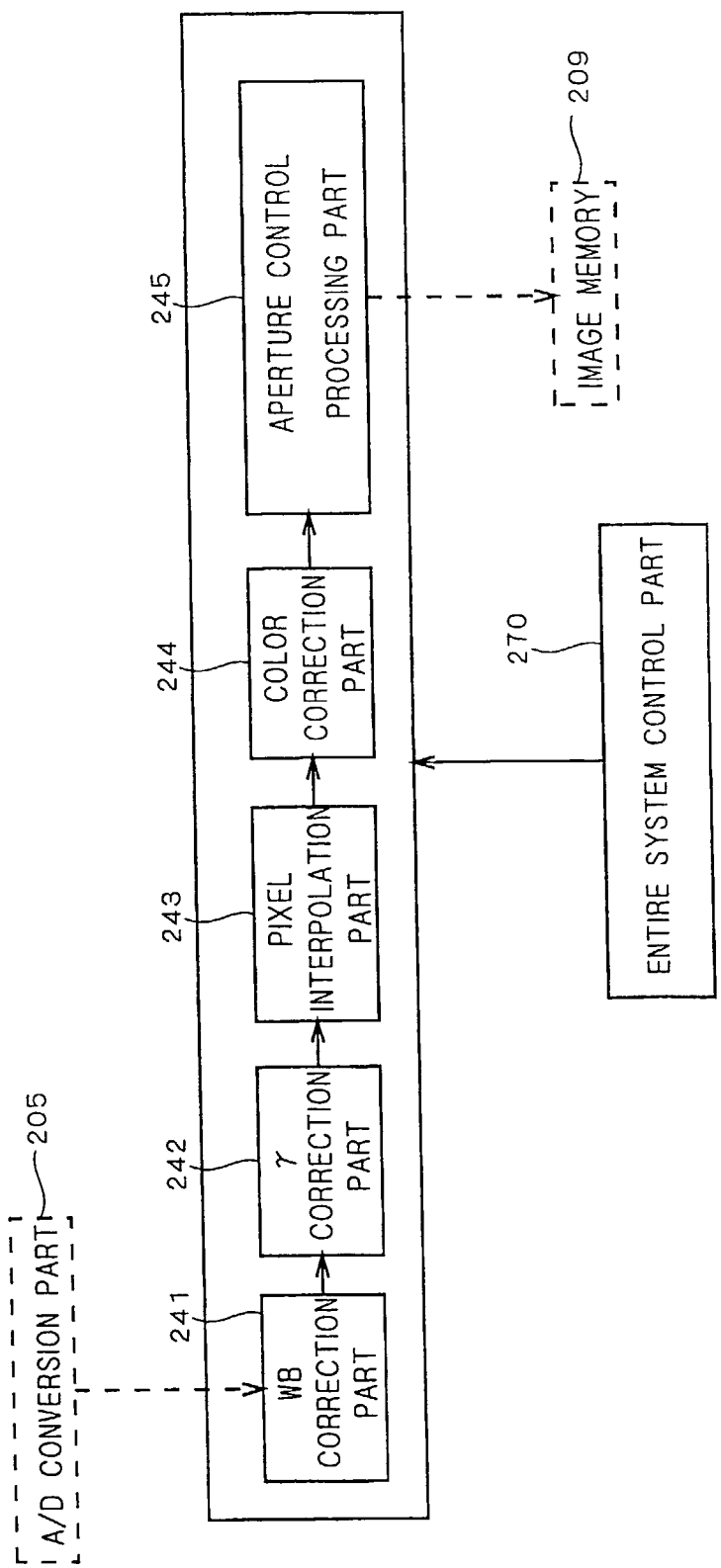
FIG. 6 is a block diagram that shows a construction of an image-processing part.

FIG. 6 is a block diagram that shows a construction of the image-processing part 240. A WB (white balance) correction part 241 is used for correcting deviations in color balance (white-balance correction) caused by differences in the spectral characteristic of image-pickup light sources. This WB correction part 241 converts values of the respective pixel components of R, G, B by using a conversion table. The respective conversion coefficients of the respective color components of the conversion table are set on image-basis by the entire system control part 270. Normally, a color balance of incident light is determined by the entire system control part 270, and based upon the results of the determination, a conversion coefficient is inputted so that the WB correction part 241 carries out a correcting process so that white things appear to be white.

Figure 7:
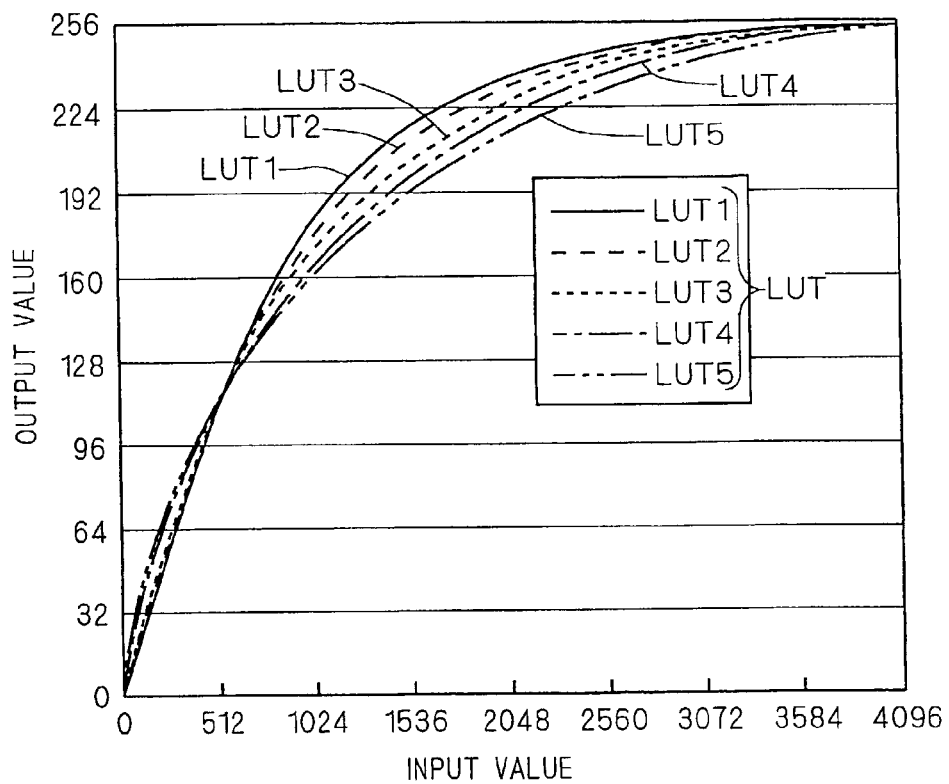
FIG. 7 is a drawing that shows an example of a γ correction table.

A γ correction part 242 carries out a correcting process (γ correction) so as to make the gradation characteristic of an image fit to the γ characteristic of a general display device. This γ correction part 242 has a γ correction table that has been preliminarily set, and corrects the value of each pixel data by using this γ correction table. In the present preferred embodiment, five γ correction tables LUT1 to LUT5, shown in FIG. 7, are used. In this figure, the axis of abscissas represents an input value of an image signal, and the axis of ordinates represents an output value from the γ correction circuit 242. Normally, γ correction table LUT3 that fits to the characteristic of the display device is used, and depending on image-pickup modes, γ correction tables LUT1 to LUT5 are selectively used. In the case when γ correction table LUT1 is used, since a slight gap in an input value is enlarged in the output value, it is possible to obtain an image in which bright portions and dark portions are clearly distinguished with emphasized contract. Moreover, in the case when γ correction table LUT5 is used, it is possible to obtain an image which has moderate gradations with less emphasis in contrast. As to which γ correction table LUT should be used, entire system control part 270 makes a determination on image-basis.

A pixel interpolation part 243 carries out an interpolation process for lacking color pixels to provide data of three colors of RGB for each pixel. For example, in the case when the image-pickup face of the CCD 303 has a Bayer arrangement in which the pixel arrangement is made in association with the respective color components, each pixel is designed to detect a luminance component for each color of RGB corresponding to the Bayer arrangement. Therefore, the pixel interpolation process is carried out in such a manner that each pixel has data for all the color components; thus, a coloring process for each image is carried out.

A color correction part 244 changes the type of color spaces so that pixel data consisting of three colors of RGB is converted to YCrCb (luminance component Y and color-difference components Cr, Cb). In addition to this process, a color correction process (color reproduction process), which corrects colors by emphasizing chromaticness of an image to make the colors represented in preferable colors when the image is displayed, is carried out. In the present preferred embodiment, conversions are carried out by using the following equations 1 to 3.

$$\begin{pmatrix} Y \\ Cr \\ Cb \end{pmatrix} = \begin{pmatrix} +0.30 & +0.60 & +0.10 \\ +0.50 & -0.42 & -0.08 \\ -0.17 & -0.37 & +0.50 \end{pmatrix} \times \begin{pmatrix} R \\ G \\ B \end{pmatrix} = M1 \times \begin{pmatrix} R \\ G \\ B \end{pmatrix} \quad \text{[Equation 1]}$$

$$\begin{pmatrix} Y \\ Cr \\ Cb \end{pmatrix} = \begin{pmatrix} +0.30 & +0.60 & +0.10 \\ +0.79 & -0.61 & -0.18 \\ -0.13 & -0.78 & +0.90 \end{pmatrix} \times \begin{pmatrix} R \\ G \\ B \end{pmatrix} = M2 \times \begin{pmatrix} R \\ G \\ B \end{pmatrix} \quad \text{[Equation 2]}$$

$$\begin{pmatrix} Y \\ Cr \\ Cb \end{pmatrix} = \begin{pmatrix} +0.30 & +0.60 & +0.10 \\ +0.94 & -0.72 & -0.21 \\ -0.15 & -0.93 & +1.10 \end{pmatrix} \times \begin{pmatrix} R \\ G \\ B \end{pmatrix} = M3 \times \begin{pmatrix} R \\ G \\ B \end{pmatrix} \quad \text{[Equation 3]}$$

Here, a conversion matrix M1 in equation 1 is a matrix that is generally used for color space conversion. Moreover, although conversion matrixes M2, M3, shown in equations 2 and 3, have the same coefficient with respect to the luminance component Y, they have different coefficients with respect to color-difference components Cr, Cb so that these coefficients function to further enlarge the color-difference components Cr, Cb. In other words, by carrying out conversions using the conversion matrixes M2, M3, it is possible to emphasize only the chromaticness. With respect to the conversion matrixes M2 and M3, the conversion matrix M3 is allowed to further emphasize the chromaticness in comparison with the conversion matrix M2, and it is possible to alter the degree of emphasis of the chromaticness by making a switch among the conversion matrixes M1 to M3. The color correction part 244 preliminarily has the conversion matrixes M1 to M3, and as to which the conversion matrix M1 to M3 should be used, the entire system control part 270 makes a determination on image-basis.

Figure 8:
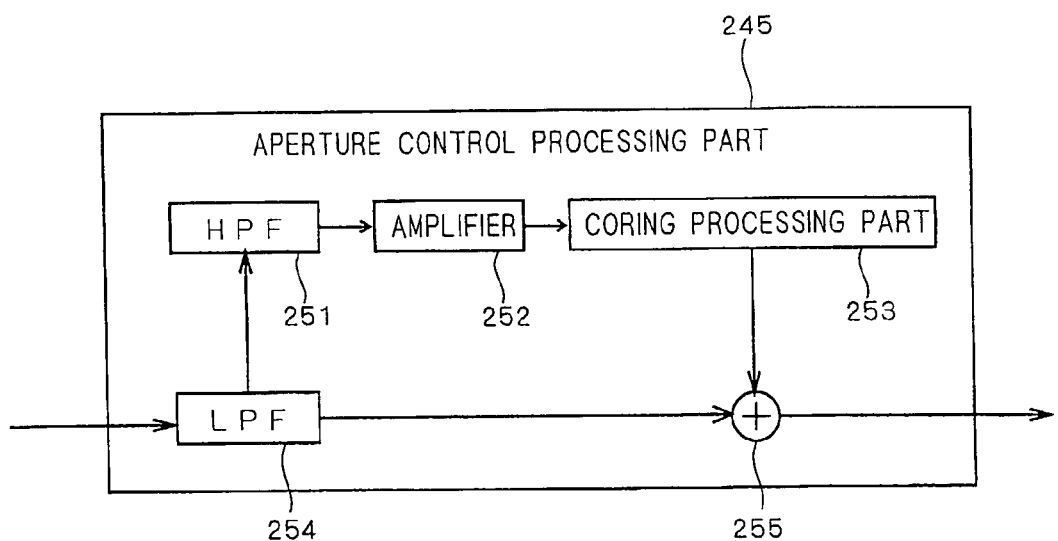
FIG. 8 is a block diagram that shows a construction of an aperture control processing part.

An aperture control processing part 245 carries out a sharpness process for increasing the resolution of an image by emphasizing high frequency components as well as a coring process for removing noise from an image. FIG. 8 is a block diagram that shows a construction of the aperture control processing part 245. As shown in the figure, the aperture control processing part 245 is provided with an HPF (high-pass filter) 251, an LPF (low-pass filter) 254, an amplifier 252, a coring processing part 253 and an adder 255.

High frequency components (edge components) are extracted from the inputted image signal by the HPF 251, and the extracted high frequency components are subjected to gain adjustments by the amplifier 252, thereby making it possible to emphasize the edge components. Then, components that are not more than a predetermined value (noise components) are removed by the coring processing part 253. Moreover, the signals which have been smoothed by the LPF 254 are added by the adder 255 to form an output signal. In this manner, an image which has been subjected to the edge emphasizing process (sharpness process) and the noise-component removing process is provided.

Figure 9A:
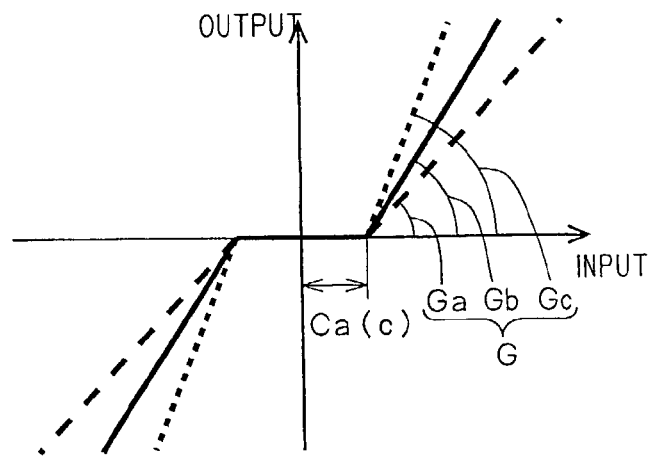
FIGS. 9A to 9C are drawings that show processing characteristics of an amplifier and a coring processing part.
Figure 9B:
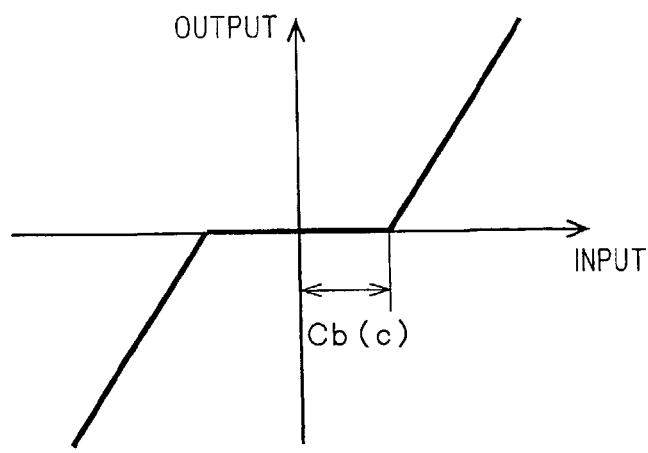
Figure 9C:
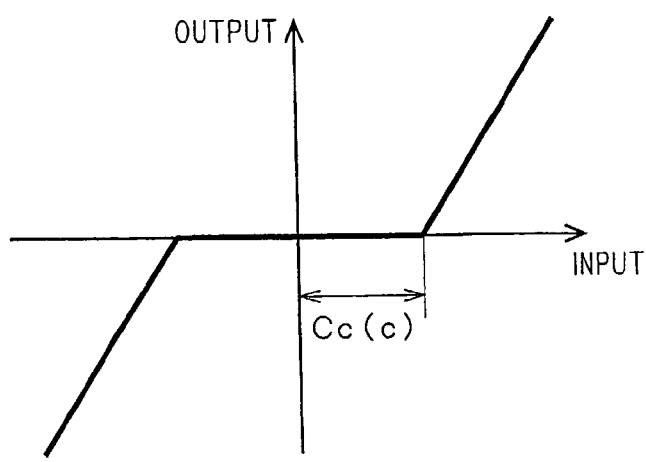

FIGS. 9A to 9C are drawings that show processing characteristics of the amplifier 252 and the coring processing part 253 in the present preferred embodiment. In FIGS. 9A to 9C, the axis of abscissas indicates a level at the time when a value outputted from the HPF 251 is inputted, and the axis of ordinates indicates an output level after the processes in the amplifier 252 and the coring processing part 253.

The amplifier 252 carries out a conversion with a gradient G (Ga to Gc) of a slanting portion shown in the figures. In other words, the gradient G corresponds to a gain value of high frequency components, and in the case of a great gradient such as symbol Gc, the degree of edge emphasis becomes greater, while in the case of a small gradient such as symbol Ga, the degree of edge emphasis becomes smaller.

Moreover, when the absolute value of an output value from the HPF 251 is not more than the coring amount C (Ca to Cc) shown in the figures, the coring processing part 253 converts this to 0. In other words, the amount of noise components to be removed is determined depending on the size of the coring amount C. In the present preferred embodiment, the coring amount Ca is set to the smallest, and the coring amount Cc is set to the greatest. Here, these gradient G and the coring amount C are set by the entire system control part 270 for each image.

Referring again to FIG. 5, an image memory 209 is a memory for storing image data outputted from the image-processing part 240. The image memory 209 has a storing capacity corresponding to one frame. In other words, in the case when the CCD 303 has pixels of n-rows×m-columns, the image memory 209 has the storing capacity of data of n×m pixels, and data of each pixel is stored in the corresponding address.

A VRAM (video RAM) 210 is a buffer memory of an image that is reproduced on the LCD 10. VRAM 210 has a storing capacity capable of storing image data corresponding to the number of pixels of the LCD 10.

In an image-pickup standby state with the operation mode being set to "image pickup", a live-view display is given on the LCD 10 when the LCD display is in the on-state through the operation of the LCD button 321 (see FIG. 2). More specifically, after an A/D conversion and various signal processes in the image-processing part 240 have been carried out on respective images obtained from the image-pickup part 3 every predetermined intervals, the entire system control part 270 acquires images to be stored in the image memory 209, and transfers these to the VRAM 210 so that the picked-up images are displayed on the LCD 10. Then, by updating the image displayed on the LCD 10 every predetermined time so that a live-view displaying process is carried out. The live-view display allows the user to view and confirm the subject through images displayed on the LCD 10.

Moreover, in the case of "play" in the operation mode, after a predetermined signal processing has been carried out on images read from the memory card 91 by the entire system control part 270, the resulting images are transferred to the VRAM 210, and reproduced on the LCD 10.

A flash control circuit 217 is a circuit for controlling light emission of the built-in flash 5, and allows the built-in flash 5 to emit light for a predetermined time based upon a light-emission start signal from the entire system control part 270.

A card interface 212 is an interface which carries out writing and reading operations of images to and from the memory card 91 through the card slot 17.

An operation part 250 includes the above-mentioned various switches and buttons, and information which is operated and inputted by the user is transmitted to the entire system control part 270 through the operation part 250.

The entire system control part 270, which is formed by a microcomputer, intensively controls image-pickup functions and reproducing functions. The entire system control part 270 is provided with a CPU 271 forming its main body part, a ROM 273 in which programs for effectively controlling driving operations of the respective parts inside the above-mentioned image-pickup part 3 and the camera main body part 2 are stored, and a RAM 272 that serves as a working area for carrying out calculation processes. Here, a program, recorded in a recording medium such as the memory card 91, may be read through the card interface 212, and stored in the ROM 273.

When, in the case of "image-pickup" in the operation mode, image-pickup operation is specified by the shutter button 8, the entire system control part 270 generates thumbnail images of the images taken in the image memory 209 and compressed images compressed through JPEG system, and the two types of images are stored in the memory card 91 together with tag information relating to the pickup image. The tag information includes pieces of information relating to aperture values, shutter speed values, on/off state of flash at the time of the image-pickup process and image-pickup mode, in addition to information as to whether the image is picked up in the manual selection setting or in the automatic selection setting with respect to the mode selection setting.

<3. Image-Pickup Scene Automatic Discrimination>

Moreover, when the mode selection setting is specified as the automatic selection setting, the entire system control part 270 automatically discriminates a scene, and selects an appropriate image-pickup mode. The following description will discuss image-pickup scene discrimination process which makes a discrimination as to which type of scene among six types of scene, such as "standard", "portrait", "sports action", "landscape", "sunset", "night portrait", an image-pickup scene in question is classified into.

Figure 10:
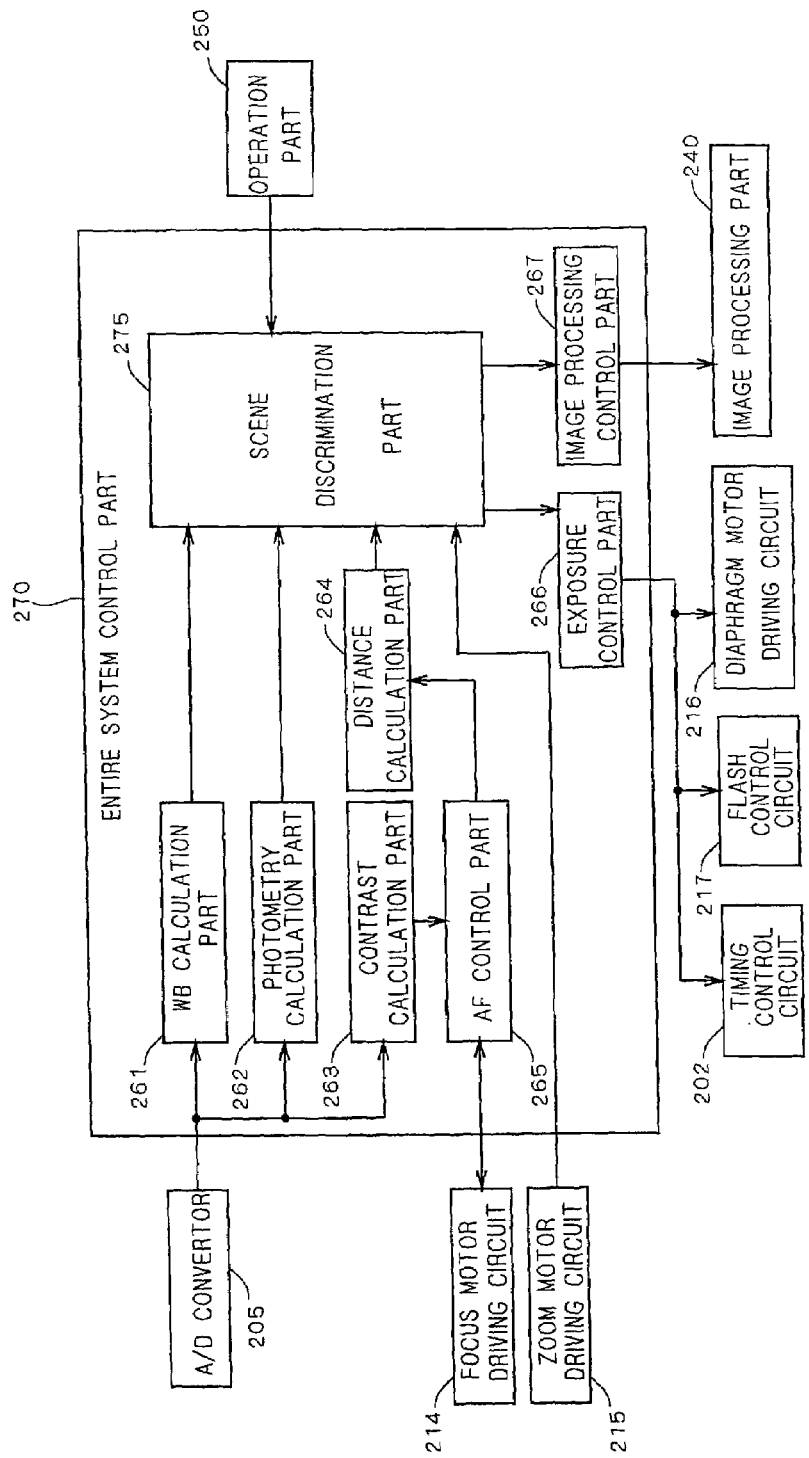
FIG. 10 is a block diagram that shows functions of a digital camera that relates to a scene discrimination process.

FIG. 10 is a block diagram that shows functions of digital camera 1 that relate to the scene discrimination process. In FIG. 10, a WB calculation part 261, a photometry calculation part 262, a contrast calculation part 263, a distance calculation part 264, an AF control part 265, an exposure control part 266, an image processing control part 267 and a scene discrimination part 275 are represented as functional blocks that are achieved by programs of the entire system control part 270.

The scene discrimination part 275 determines whether the mode selection setting given by the operation part 250 is the manual selection setting or the automatic selection setting, and in the case of the automatic selection setting, a scene discrimination process is carried out. The scene discrimination process is executed by using pieces of information relating to the focal length f of an image-pickup lens, the image-pickup magnification β, the brightness Bv, the color balance (R/G ratio, B/G ratio) and the subject movement information.

The focal length f is calculated by acquiring the zooming magnification of the zoom lens 301 set by the user from the zoom motor driving circuit 215. Here, in the present preferred embodiment, the focal length f is calculated as a value converted based upon a camera of 35 mm film.

Moreover, the image-pickup magnification β is calculated by using the following equation 4 based upon the focal length f and the image-pickup distance L.

$$\beta = f/(L-f) \quad \text{[Equation 4]}$$

Here, the image-pickup distance L is a distance to a main subject, and calculated by the distance calculation part 264 based upon information of the position of the focus lens 311 used for focusing processes acquired from the AF control part 265 for carrying out AF control operations. In the AF control of the present preferred embodiment, a contract AF system which evaluates the contrast of a signal from the A/D converter 205 by using the contrast calculation part 263 to drive the focus lens 311 to a position that provides the highest contrast is adopted. Here, when a range finding sensor, etc. is installed separately, the image-pickup distance L may be found based upon information from the range finding sensor.

Moreover, the brightness Bv is calculated by the photometry calculation part 262 based upon a signal from the A/D converter 205.

Color balance (R/G ratio, B/G ratio) is calculated by the WB (white balance) calculation part 261 based upon signals from the A/D converter 205. The WB calculation part 261 calculates the respective average values of RGB of the signals to find ratios of R and B with respect to the value of G (R/G ratio, B/G ratio). Here, the calculated color balance is also inputted to the image-processing control part 267 for carrying out controlling operations of the image-processing part 240 to be used for white balance correction.

The subject movement information is information as to whether or not a subject is in motion, and this is determined by the scene discrimination part 275 based upon the change in the image-pickup distance L successively calculated by the distance calculation part 264. When the change in the image-pickup distance L becomes not less than a predetermined value, the subject is determined as a moving subject, and when it is less than the predetermined value, the subject is determined as a still subject.

Figure 11:
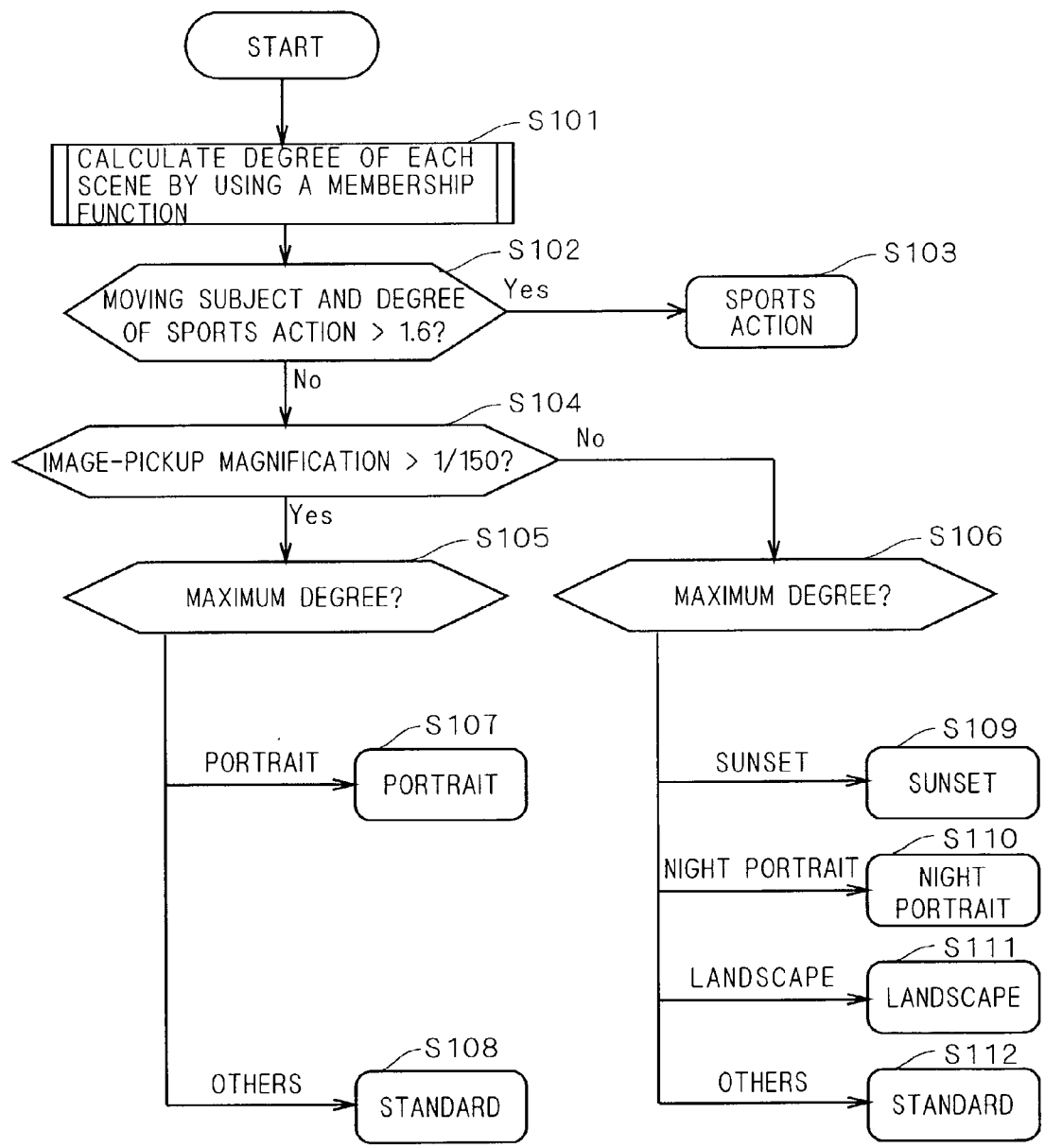
FIG. 11 is a drawing that shows a flow of image-pickup scene discriminating processes.

Based upon the respective pieces of information such as the focal length f of the image-pickup lens, the image-pickup magnification β, brightness Bv, color balance (R/G ratio, B/G ratio) and the subject movement information thus obtained, the scene discrimination part 275 carries out a discrimination process on an image-pickup scene by utilizing fuzzy inference. FIG. 11 is a drawing that shows a flow of the image-pickup scene discrimination process.

First, based upon the focal length f, the image-pickup magnification β, brightness Bv and color balance, the degree of certainty is calculated for each of image-pickup scenes by using member-ship functions shown in FIGS. 12 to 15 (step S101). The degrees of the respective image-pickup scenes are given by numeric values from 0 to 1. Here, the above-mentioned membership functions have been preliminarily stored in the ROM 273 and the like.

Figure 12:
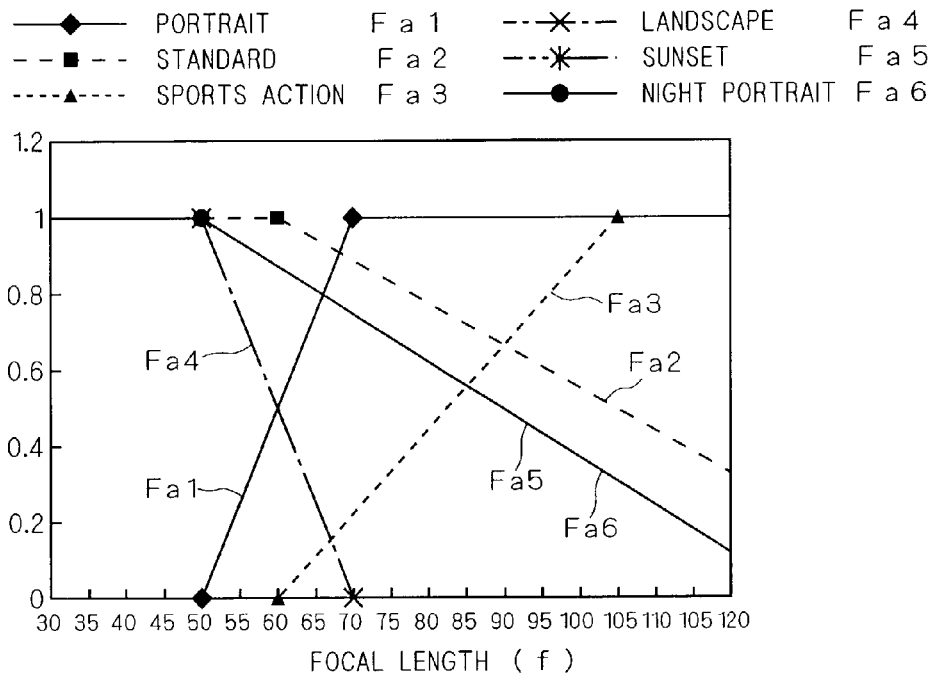
FIG. 12 is a drawing that shows one example of a membership function with respect to focal length.
Figure 13:
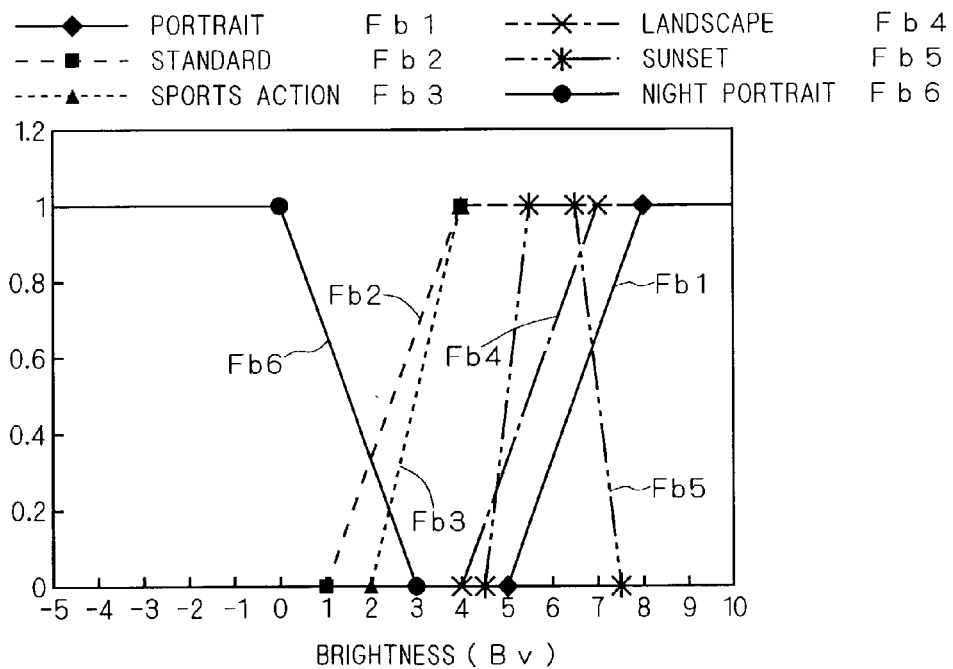
FIG. 13 is a drawing that shows one example of a membership function with respect to brightness.
Figure 14:
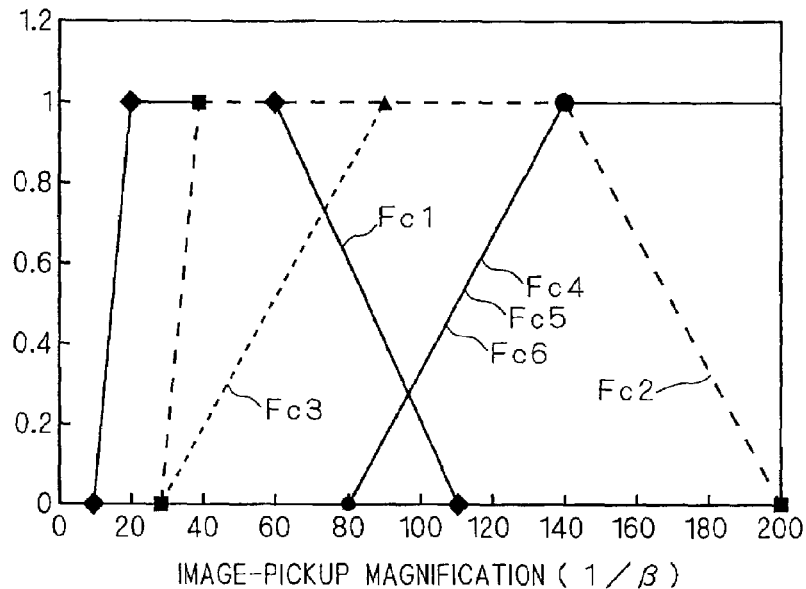
FIG. 14 is a drawing that shows one example of a membership function with respect to image-pickup magnification.

FIG. 12 shows membership functions of the focal length f, and in this figure, functions indicated by symbols Fa1 to Fa6 respectively show membership functions of "portrait", "standard", "sports action", "landscape", "sunset" and "night portrait". Further, FIG. 13 shows membership functions of the brightness Bv, and in this figure, functions indicated by symbols Fb1 to Fb6 respectively show membership functions of "portrait", "standard", "sports action", "landscape", "sunset" and "night portrait". Moreover, FIG. 14 shows membership functions of the image-pickup magnification β, and in this figure, functions indicated by symbols Fc1 to Fc6 respectively show membership functions of "portrait", "standard", "sports action", "landscape", "sunset" and "night portrait".

For example, in the case when the degrees of an image-pickup scenes with respect to a certain focal length f is calculated, with respect to the value (on the axis of abscissas) of the focal length f in FIG. 12, crossing points with the respective membership functions of the respective image-pickup scenes (for example, function Fa1 in the case of "portrait") are found, and by reading the value on the axis of ordinate, it is possible to find the degree of each image-pickup scene. In the same manner, the degrees of the respective image-pickup scenes with respect to the brightness Bv (see FIG. 13) and the image-pickup magnification β(see FIG. 14) are respectively found.

Figure 15:
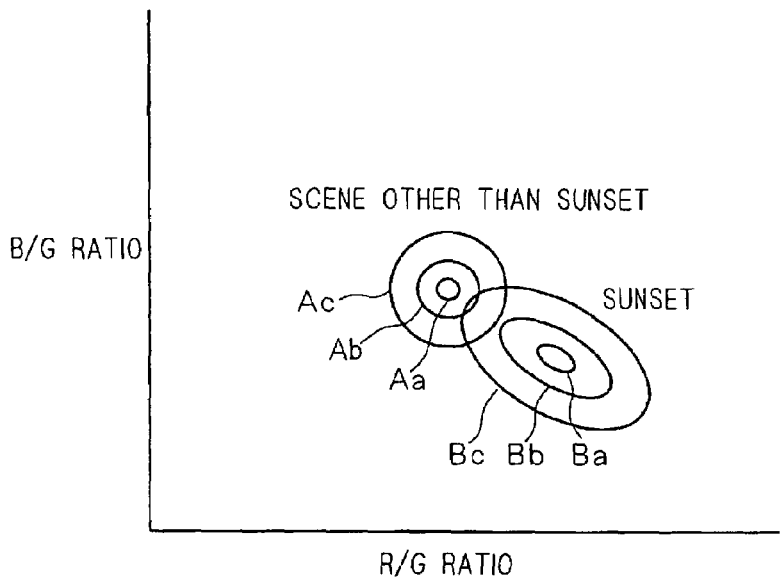
FIG. 15 is a drawing that shows one example of a membership function with respect to color balance.

Moreover, the degrees of the respective image-pickup scenes for color balance (R/G ratio, B/G ratio) are determined by plotting calculated color balances (R/G ratio, B/G ratio) on the two-dimensional coordinates represented by the R/G ratio on the axis of abscissas and the B/G ratio on the axis of ordinates shown in FIG. 15. In FIG. 15, the area indicated by symbols Ba to Be is an area representing the degrees with respect to "sunset", with the degree of "sunset" increasing toward the center area Ba. Moreover, the area indicated by symbols Aa to Ac are areas relating to the respective image-pickup scenes other than "sunset", with the degrees of the respective image-pickup scenes other than "sunset" increasing toward the center area Aa.

In this manner, the degrees of each image-pickup scene with respect to four pieces of input information of the focal length f, the image-pickup magnification β, the brightness Bv and the color balance are calculated. Then, the four degrees are added with respect to each image-pickup scene to calculate a final degree for each of the image-pickup scenes.

Next, it is determined whether or not subject movement information is derived from a moving subject and whether or not the degree of "sports action" (1.6 in the present preferred embodiment) exceeds a predetermined value (step S102), and when both of the conditions are satisfied, the image-pickup scene is determined as "sports action" (step S103).

In contrast, when the above-mentioned conditions are not satisfied in step S102, a determination is made as to whether or not the image-pickup magnification β exceeds a predetermined value (1/150 in the present preferred embodiment) (step S104), and if this is exceeded, the process proceeds to step S105, while, if not exceeded, the process proceeds to step S106.

At step S105, the maximum value of the degree of each image-pickup scene calculated as described above is determined. Then, in the case when the degree of "portrait" becomes the maximum value, the corresponding image-pickup scene is discriminated as "portrait" (step S107). Moreover, when the degree of any of the image-pickup scenes other than "portrait" becomes the maximum value, or when a plurality of maximum values exist, the corresponding image-pickup scene is discriminated as "standard" (step S108).

In the same manner, also in step S106, the maximum value of the degree of each image-pickup scene calculated as described above is determined. Then, in the case when the degree of "sunset" becomes the maximum value, the corresponding image-pickup scene is discriminated as "sunset" (step S109). When the degree of "night portrait" becomes the maximum value, the corresponding image-pickup scene is discriminated as "night portrait" (step S110). When the degree of "landscape" becomes the maximum value, the corresponding image-pickup scene is discriminated as "night portrait" (step S111) Moreover, when the degree of image-pickup scene other than "sunset", "night portrait" and "landscape" becomes the maximum value or when a plurality of maximum values exist, the corresponding image-pickup scene is discriminated as "standard" (step S112).

As described above, the scene discrimination part 275 carries out a discriminating process of image-pickup scenes, and selects a suitable image-pickup mode based upon the results of discrimination. The selected image-pickup mode is inputted to the exposure control part 266 and the image-processing control part 267.

Here, in the case when the mode selection setting is given as the manual selection setting, the image-pickup mode selected by the operation part 250 is also inputted to the exposure control part 266 and the image-processing control part 267 through the scene discrimination part 275. Moreover, in the case when the image-pickup mode is inputted to the exposure control part 266 and the image-processing control part 267, the scene discrimination part 275 simultaneously inputs information as to whether the mode selection setting is the manual selection setting or the automatic selection setting.

<4. Control Contents>

Based upon the image-pickup mode and mode selection setting inputted from the scene discrimination part 275, the exposure control part 266 carries out an exposure control operation and the image-processing control part 267 carries out an image-processing control operation. The exposure control part 266 and the image-processing control part 267 carry out the exposure control operation and image-processing control operation by reference to control tables preliminarily stored in the ROM 273.

FIG. 16 is a drawing that shows one example of a control table (exposure control table) 51 relating to the exposure control, and FIGS. 17 and 18 are drawings that show one example of a control table (image-processing control table) 52 relating to the image processing.

As shown in FIG. 16, the exposure control table 51 has control contents relating to exposure controls of "aperture value and shutter speed" and "flash light emission" with respect to each of the image-pickup modes in a mutually associated manner. Here, as shown in FIGS. 17 and 18, the image-processing control table 52 has control contents relating to image processes such as "white-balance correction process", "γ correction process", "sharpness process", "coring process" and "color correction process" with respect to each of the image-pickup modes in a mutually associated manner.

The respective control contents are set so as to deal with the manual selection setting and the automatic selection setting respectively in the mode selection setting. These control contents are actually described in a format such as numeric value codes that is easily dealt by a computer, and obtained as parameter values relating to the image quality.

Referring to the exposure control table 51, the exposure control part 266 acquires the values corresponding to the image-pickup mode and mode selection setting inputted from the scene discrimination part 275 so that the acquired values are set as exposure control parameters. Then, the exposure control part 266 carries out an exposure controlling operation based upon these exposure control parameters.

Moreover, referring to the image-processing control table 52, the exposure control part 267 acquires the values corresponding to the image-pickup mode and mode selection setting inputted from the scene discrimination part 275 so that the acquired values are set as image-processing parameters. Then, the image-processing control part 267 carries out an image-processing controlling operation based upon these image-processing control parameters.

In the control tables 51, 52, the control contents related to "standard" mode are standard control contents in the digital camera 1. In this case, the control contents are the same in both of the manual selection setting and the automatic selection setting, and become reference values of parameters. In the case when an image-pickup process is carried out based upon these control contents, an image that is almost free from flaws, and independent of image-pickup scenes is obtained.

Moreover, with respect to the control contents at the time of manual selection setting, optimal values of parameters corresponding to the respective image-pickup modes are set. In other words, in the case when an image-pickup process is carried out based upon the control contents at the time of the manual selection setting, it is possible to obtain an image on which the maximum effects are exerted in accordance with the image pickup mode.

In contrast, with respect to the control contents at the time of the automatic selection setting, a value between the optimal value of each parameter corresponding to each image-pickup mode and the reference value of the above-mentioned parameter is set. In other words, this value provides limited effects in comparison with the effects obtained in the case of the optimal value of the parameter.

The scene discrimination part 275 carries out a discriminating process with sufficient precision for practical use; however, in such a case in which specific conditions occur simultaneously, this might cause a misdiscrimination. Supposing that the parameters are set to optimal values in accordance with the respective image-pickup modes at the time of the automatic selection setting, if a certain scene is misdiscriminated to an image-pickup scene that aims at an opposite effect, the resulting image is subjected to adverse effects and serious degradation in the image quality.

Therefore, at the time of the automatic selection setting, the value of each parameter is set between the optimal value and the reference value so that the effects corresponding to the image-pickup mode are exerted; however, an image on which the degree of the effects is weakened in comparison with the manual selection setting is obtained. In other words, even when a misdiscrimination occurs, it is possible to prevent serious degradation in the image quality.

<4-1. Exposure Control>

Next, an explanation will be given of specific contents of exposure control described in the exposure control table 51.

In the exposure control table 51, "aperture value and shutter speed" indicates the control contents relating to a so-called AE control. The exposure control part 266 sets the control contents as parameters. Then, based upon the parameters, the aperture value and the shutter speed are determined to transmit control signals to the diaphragm motor driving circuit 216 and the timing control circuit 202.

The "standard" mode is arranged so that, based upon the brightness of a subject acquired from the photometry calculation part 262, the aperture value and shutter speed are calculated in accordance with a standard program.

In "portrait" mode, an AE control operation is carried out with the aperture value being open (F value=2.8) on aperture priority basis. The objective of this setting is to make the depth of field shallower to obtain an image with only the main subject (person) being beautifully distinguished while the background is faded. At the time of the automatic selection setting, a value (F value=4), which is increased by one step from the optimal value (F value=2.8) of the aperture value, is set. This arrangement makes it possible to prevent the background from fading too much even in the case of a misdiscrimination of the image-pickup scene.

At the time of manual selection setting in "sports action" mode, an AE control operation is carried out with the shutter speed being set at a high speed (1/500 second) on shutter-speed priority basis. the objective of this setting is to seize an instantaneous movement of a subject that is moving quickly. At the time of automatic selection setting, a speed (1/250 second), which is decreased by one step from the optimal value (1/500 second) of the shutter speed, is set. When the shutter speed is set at a high speed, the aperture value is set comparatively on the opening side, and the resulting image tends to have faded objects except for the main subject which is focused; however, the decreased shutter speed as described above makes it possible to prevent objects except for the main subject from fading too much even in the case of a misdiscrimination of the image-pickup scene.

At the time of manual selection setting in "landscape" mode, an AE control operation is carried out with the aperture value being increased (F value=16) on aperture priority basis. The objective of this setting is to make the depth of field deeper to obtain an image on which both of the main subject (person) and the background are well-focused. At the time of automatic selection setting, a value (F value=11), which is decreased by one step from the optimal value (F value=16) of the aperture value, is set. When the aperture of the diaphragm 302 is made smaller, the shutter speed becomes comparatively slower, a camera shake tends to occur; however, by increasing the aperture value as described above, it becomes possible to prevent the occurrence of a camera shake even in the case of a misdiscrimination of the image-pickup scene.

At the time of manual selection setting in "sunset" or "night portrait" mode, an AE control operation is carried out with the diaphragm 302 being open (F value=2.8) on aperture priority basis, without any limitation to the shutter speed. The objective of this setting is to increase the amount of exposure as much as possible, in the case of low brightness of a subject in the evening or at night. At the time of automatic selection setting, the shutter speed is limited to 1/8 second. By limiting the shutter speed in this manner, it becomes possible to prevent the occurrence of an extremely camera shake even in the case of a misdiscrimination of the image-pickup scene. Moreover, it is also possible to prevent the shutter speed from becoming longer while the user is unaware thereof.

In the exposure control table 51, "flash light emission" represents the control contents for allowing built-in flash 5 to emit light. The exposure control part 266 sets these control contents as parameters. Then, based upon the parameters, it transmits a control signal to the flash control circuit 217 to carry out a flash light-emission controlling operation.

In "standard" mode, the built-in flash 5 is designed to emit light in the case when the brightness of a subject acquired from the photometry calculation part 262 becomes not more than a camera-shake limitation brightness BvH (APEX value). Here, the camera-shake limitation brightness BvH is calculated based upon the following equation 5.

$$BvH = \log_2(f) + Av0 - Sv \qquad \text{[Equation 5]}$$

In equation 5, f represents the aforementioned focal length f, Av0 represents an opened aperture value of the diaphragm 302, and Sv represents a sensitivity value (converted value to film sensitivity value is used) of the CCD 303.

At the time of manual selection setting in "portrait" mode, the built-in flash 5 is allowed to emit light in the case when the brightness of a subject becomes not more than a camera-shake limitation brightness BvH-2 (APEX value). In other words, it is allowed to emit light at a brightness level that is lower than that in "standard" mode. The objective of this setting is to prevent the face and the like of a subject (person) from becoming too white due to the flash light and resulting in a monotonous image. At the time of automatic selection setting, the brightness of a subject at which the built-in flash 5 is allowed to emit light is set to a brightness level (not more than a camera-shake limitation brightness BvH-1) that is higher than the optimal value (not more than a camera-shake limitation brightness BvH-2). When the brightness level at which the built-in flash 5 is allowed to emit light is set to a lower level, the camera shake tends to occur; however, by setting this to a brighter level as described above, it becomes possible to prevent the occurrence of a camera shake even in the case of a misdiscrimination of the image-pickup scene.

Here, in the control contents of "flash light emission", in the case of "sports action" or "landscape" mode, the same setting as "standard" mode is given. Moreover, in the case of "sunset" or "night portrait" mode, the setting of light-emission inhibition is given since, even when the built-in flash 5 is used, the flash light does not reach the subject.

<4-2. Image-Processing Control>

The following description will discuss specific contents of the image-processing control described in the image-processing control table 52.

In the image-processing control table 52, "white-balance correction" represents the control contents of a white-balance correcting process in the WB correction part 241. The image-processing control part 267 sets these control contents as parameters. Then, based upon the parameters, a conversion coefficient to be used for the white-balance correction is determined, and this is transmitted to the WB correction part 241.

In "standard mode", an auto white-balance setting, which calculates a conversion coefficient based upon color balance (R/G ratio, B/G ratio) obtained from the WB calculation part 261 in such a manner that white objects appear to be white, is given.

At the time of manual selection setting in "sunset" or "night portrait" mode, a conversion coefficient, formed based upon preliminarily set day light (standard day light), is used in a fixed manner independent of acquired color balance. The objective of this setting is to obtain an image that properly represents a dusk atmosphere with red color remaining therein in the case of "sunset" mode, or an image to which colors of colored light sources (such as neon signs) are reflected in the case of "night portrait" mode. At the time of automatic selection setting, setting is made so that the average value between the conversion coefficient derived from day light that is an optimal value and the convention coefficient derived from auto white balance that is a reference value is set as the conversion coefficient. In the case when the conversion coefficient derived from day light is used, deviations in color balance are hardly corrected so that the tendency of the color of the illumination light source remains; however, the application of the conversion coefficient derived from the average value as described above makes it possible to prevent the tendency of the color of the illumination light source from remaining too strongly even in the case of a misdiscrimination of the image-pickup scene.

Here, in the control contents of "white balance correction", in the case of "portrait" mode, "sports action" mode and "landscape" mode, the same setting as "standard" mode is given.

In the image-processing control table 52, "γ correction" represents a γ correction table LUT that is used for γ correction in the γ correction part 242. The image-processing control part 267 sets γ correction table LUT thus given as parameters, and transmits these to the γ correction part 242.

In "standard" mode, setting is made so that γ correction table LUT3 (see FIG. 7), which is suitable for characteristics of a generally-used display device, is used.

At the time of manual selection setting, in "portrait" mode, γ correction table LUT5, which reduces emphasis in contrast, is used. The objective of this setting is to obtain an image in which skin of the subject (person) is smoothly represented beautifully. At the time of automatic selection setting, γ correction table LUT4, which has the averaged characteristics between γ correction table LUT5 becoming the optimal value and γ correction table LUT3 forming the reference value, is used (see FIG. 7). As a result, it is possible to prevent the resulting image from becoming too monotonous due to reduction in contrast even in the case of a misdiscrimination of the image-pickup scene.

At the time of manual selection setting, in "sports action" mode, γ correction table LUT1 which further emphasizes contrast is used. The objective of this setting is to obtain a dynamic image with vivid motions. At the time of automatic selection setting, γ correction table LUT2, which has the averaged characteristics between γ correction table LUT1 forming the optimal value and γ correction table LUT3 forming the reference value, is used (see FIG. 7). As a result, it is possible to prevent the resulting image from having too much emphasis on contrast even in the case of a misdiscrimination of the image-pickup scene.

Here, in the control contents of "γ correction", in the case of "portrait" mode, "sports action" mode and "landscape" mode, the same setting as "standard" mode is given.

In the image-processing control table 52, "color correction" represents a conversion matrix that is used for a color correcting process in the color correction part 244. The image-processing control part 267 sets the conversion matrix thus given as parameters, and transmits these to the color correction part 244.

In "standard" mode, setting is made so that the conversion matrix M1, which is a general color space conversion-use matrix, is applied.

At the time of manual selection setting, in "landscape" or "sunset" mode, the conversion matrix M3, which has a strong tendency to emphasize the chromaticness, is used. The objective of this setting is to obtain an image having clear, vivid colors by emphasizing colors of blue sky, lawn, etc. in the case of "landscape" mode or an image that properly represents a dusk atmosphere with red color remaining therein in the case of "sunset" mode. At the time of automatic selection setting, the conversion matrix M2, which has a reduced degree of emphasis on the chromaticness in comparison with the conversion matrix M3 that forms an optimal value, is used. As a result, it is possible to prevent the resulting image from having too much emphasis on colors, even in the case of a misdiscrimination of the image-pickup scene.

Here, in the control contents of "color correction", in the case of "portrait" mode, "sports action" mode and "night portrait" mode, the same setting as "standard" mode is given.

In the image-processing control table 52, "sharpness" represents a gain value in high-frequency components in a sharpness process in the aperture control processing part 245. This gain value (which corresponds to the gradient G of a slanting portion shown in FIGS. 9A to 9C) is represented by a relative value obtained when the gain value in "standard" mode is set to 1. The image-processing control part 267 sets the gain values thus given as parameters, and transmits the gradient G to the aperture control processing part 245.

At the time of manual selection setting, in "portrait" mode, a gain value (0.8), which has a weak tendency to emphasize high-frequency components, is set. The objective of this setting is to obtain an image in which skin of a subject (person) is smoothly represented fairly, by suppressing the edge emphasis on the image. At the time of automatic selection setting, the gain value is set to an intermediate value (0.9) between the gain value (0.8) that forms an optimal value and the gain value (1) that forms a reference value. As a result, it becomes possible to prevent the resulting image from having a reduction in the resolution by suppressing the degree of edge emphasis, even in the case of a misdiscrimination of the image-pickup scene.

At the time of manual selection setting, in "sports action" mode or "landscape" mode, a gain value (1.2), which has a strong tendency to emphasize high-frequency components, is set. The objective of this setting is to obtain an image which clearly shows a maim subject located in a long distance in "sports action" mode, or an image which clearly represents even the background in "landscape" mode. At the time of automatic selection setting, the gain value is set to an intermediate value (1.1) between the gain value (1.2) that forms an optimal value and the gain value (1) that forms a reference value. As a result, it becomes possible to prevent the resulting image from having too much edge emphasis.

Here, in the control contents of "sharpness", in the case of "sunset" mode and "night portrait" mode, the same setting as "standard" mode is given.

In the image-processing control table 52, "coring" represents a coring amount C in a coring process carried out by the aperture control processing part 245 (coring process part 253). The image-processing control part 267 sets the coring amounts thus given as parameters, and transmits these to the aperture control processing part 245.

In "standard" mode, the minimum coring amount Ca (see FIG. 9A) is set.

At the time of manual selection setting, in "night portrait" mode, the maximum coring amount Cc (see FIG. 9C) is set. Since the brightness of a subject is low, noise is amplified in response to an increase in the gain in the AGC circuit of signal processing circuit 313. Therefore, the coring amount C is set as a great value in order to eliminate the amplified noise. At the time of automatic selection setting, a coring amount Cb, which is between the coring amount Cc that becomes an optimal value and the coring amount Ca that becomes a reference value, is set. As a result, it is possible to prevent high-frequency components other than noise components of an image from being eliminated.

Here, in the control contents of "coring", in the case of "portrait", "sports action", "landscape" and "sunset" modes, the same setting as "standard" mode is given.

<5. Outline of the Operation>

Figure 19:
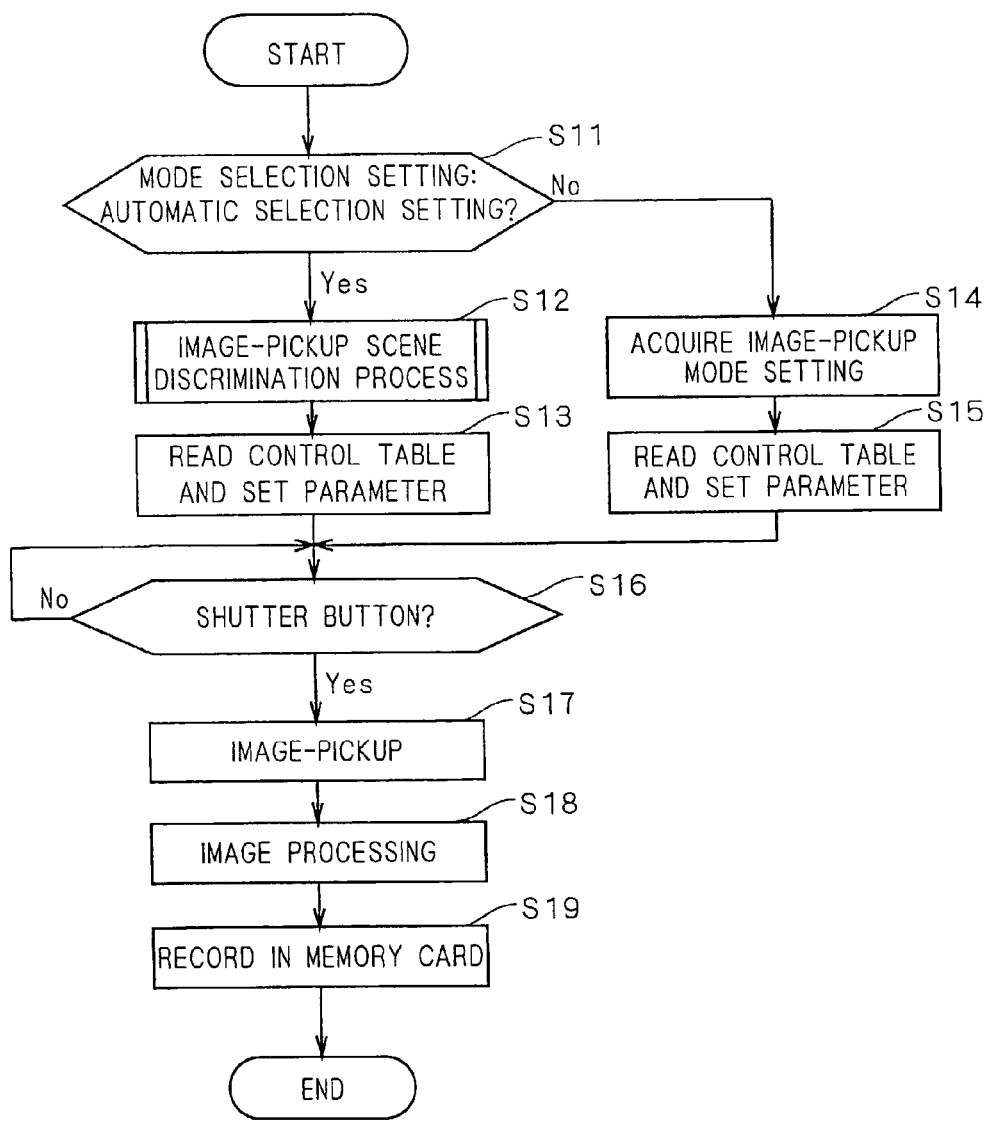
FIG. 19 is a drawing that shows a flow of operations of the digital camera.

The following description will schematically discuss operations of digital camera 1. FIG. 19 is a drawing that shows a flow of operations of digital camera 1.

First, the scene discrimination part 275 determines whether the mode selection setting specified by the operation part 250 is the automatic selection setting or the manual selection setting (step S11).

In the case of the automatic selection setting, the scene discrimination part 275 carries out the aforementioned scene discrimination process. Thus, the image-pickup scene is discriminated and a suitable image-pickup mode is selected (step S12). The selected image-pickup mode and information indicating that the automatic selection setting is given as the mode selection setting are inputted to the exposure control part 266 and the image-processing control part 267.

Successively, referring to control contents at the time of the automatic selection setting on the exposure control table 51, the exposure control part 266 sets exposure control parameters. In the same manner, referring to control contents at the time of the automatic selection setting on the image-processing control table 52, the image-processing control part 267 sets image-processing control parameters (step S13).

Here, at the time of the manual selection setting, scene discrimination part 275 acquires the image-pickup mode selected by the user through operation part 250 (step S14), and inputs the selected image-pickup mode and information indicating that the manual selection setting is given as the mode selection setting to the exposure control part 266 and the image-processing control part 267.

Successively, referring to control contents at the time of the manual selection setting on the exposure control table 51, the exposure control part 266 sets exposure control parameters. In the same manner, referring to control contents at the time of the manual selection setting on the image-processing control table 52, the image-processing control part 267 sets image-processing control parameters (step S15). In this manner, the exposure control part 266 and the image-processing control part 267 set parameters relating to image quality in a different manner between cases in which the mode selection setting is determined as the manual selection setting and in which the mode selection setting is determined as the automatic selection setting.

Next, when the user presses shutter button 8 (step S16), the exposure control part 266 determines an aperture value and a shutter speed based upon the set exposure control parameters, and also determines whether or not the light emission of the built-in flash 5 is required. Thus, the exposure control part 266 is allowed to carry out an exposure controlling operation in accordance with the image-pickup mode and mode selection setting. Then, the CCD 303 is exposed for the set exposure time (shutter speed) so that an image of a subject is picked up (step S17).

After the exposure, an image signal, outputted from the CCD 303, is subjected to a predetermined analog signal processing in the signal processing circuit 313, converted to pixel data of 12 bits in the A/D converter 205, and then inputted to the image-processing part 240. The image, inputted to the image-processing part 240, is subjected to the above-mentioned image processes by the WB correction part 241, the γ correction part 242, the pixel interpolation part 243, the color correction part 244 and the aperture control processing part 245. These image processes are carried out under control of the image-processing control part 267 based upon set image-processing control parameters. In other words, the image processes are carried out in accordance with the image-pickup mode and the mode selection setting (step S18). An image, which has been subjected to a sequence of image processes in the image-processing part 240, is stored in the image memory 209.

Successively, the entire system control part 270 generates thumbnail images of the images taken in the image memory 209 and compressed images compressed through JPEG system, and the two types of images are stored in the memory card 91 together with tag information relating to the picked-up image (step S19).

The exposure control part 266 and the image-processing control part 267 include both of the functions as a first parameter setting part for setting parameters that exerts the greatest effects on the image quality and a second parameter setting part for setting parameters that suppress the effects exerted on the image quality. In other words, with respect to the above-mentioned operation of digital camera 1, the exposure control part 266 and the image-processing control part 267 selectively activate either of the functions based upon the results of determination of a mode selection setting at the time of an image-pickup operation. More specifically, at the time of manual selection setting in the mode selection setting inputted from the scene discrimination part 275, the exposure control part 266 and the image-processing control part 267 selectively activate the function of the first parameter setting part to set predetermined values that exert the greatest effects on the image quality as parameters. Moreover, at the time of automatic selection setting in the mode selection setting, the exposure control part 266 and the image-processing control part 267 selectively activate the function of the second parameter setting part to set values that exert suppressed effects on the image quality and are different from the above-mentioned predetermined values as parameters.

As described above, in the digital camera 1 in the present preferred embodiment, it is determined whether the mode selection setting at the time of an image-pickup operation is the manual selection setting or the automatic selection setting, and in the case of the manual selection setting that has no possibility of a misdiscrimination of the image-pickup scene, parameters that exert the greatest effects on the image quality are set, while in the case of the automatic selection setting that has a possibility of a misdiscrimination of the image-pickup scene, parameters that exert suppressed effects on the image quality are set. Therefore, when the user selects the image-pickup mode, it is possible to obtain an image on which the greatest effects are exerted in its image-pickup scene, and even at the time of a misdiscrimination in the case of the selection of the automatic image-pickup mode, it is possible to prevent serious degradation in the image quality in the resulting image.

<6. Modified Example>

With respect to the functions that are achieved by software processes in the entire system control part 270 of digital camera 1 of the present preferred embodiment, one portion or the entire portion thereof may be achieved by exclusively used circuits. Moreover, with respect to processes in the image processing part 240 in the present preferred embodiment, it is not necessary to carry out all the processes, and only one portion thereof may be carried out.

Moreover, the respective processing parts such as the image-processing part 240 (including the WB correction part 241, the γ correction part 242, the pixel interpolation part 243, the color correction part 244 and the aperture control processing part 245) may be achieved by processes using hardware, or may be achieved by processes using software.

Figure 20:
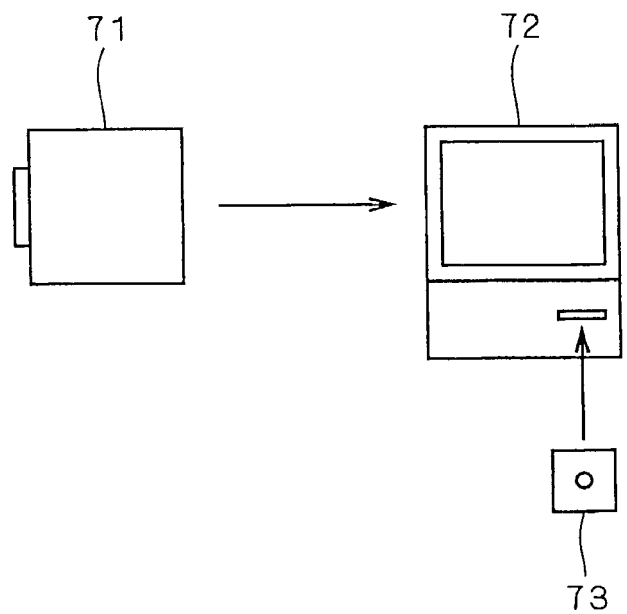
FIG. 20 is a drawing that shows a construction of an image processing system.

The processes in the image-processing part 240 may be achieved by software processes so that the image processes, carried out by the digital camera 1 of the present preferred embodiment, may be achieved by a general-use computer. FIG. 20 is a drawing that shows a construction of such an image-processing system 7.

The image-processing system 7 is constituted by a digital camera 71 which stores a picked-up image as it is in a memory card without carrying out image processing thereon, and a computer 72 that carries out image processing on the picked-up image stored in the memory card.

A camera having the same construction as digital camera 1 of the above-mentioned preferred embodiment may be used as the digital camera 71. However, in the case of the digital camera 71, an exposure controlling process is carried out in the same manner as the above-mentioned preferred embodiment, and the picked-up image is stored in the memory card without being subjected to any image processing. In this case, information indicating the image-pickup mode at the time of the image-pickup process and information as to whether the mode selection setting is the manual selection setting or the automatic selection setting are simultaneously stored as tag information.

The computer 72 is a general-use computer that is provided with a CPU, a ROM, a RAM, a memory device, a display, a memory card reading device and the like. Programs are preliminarily installed in the computer 72 from a recording medium 73 such as a magnetic disk, an optical disk and a magneto-optical disk. Thus, the general-use computer 72 may be utilized as an image-processing apparatus that carries out processes in accordance with the present invention. Here, the same table as the image-processing control table 52 in the present preferred embodiment is stored in a predetermined memory device.

Figure 21:
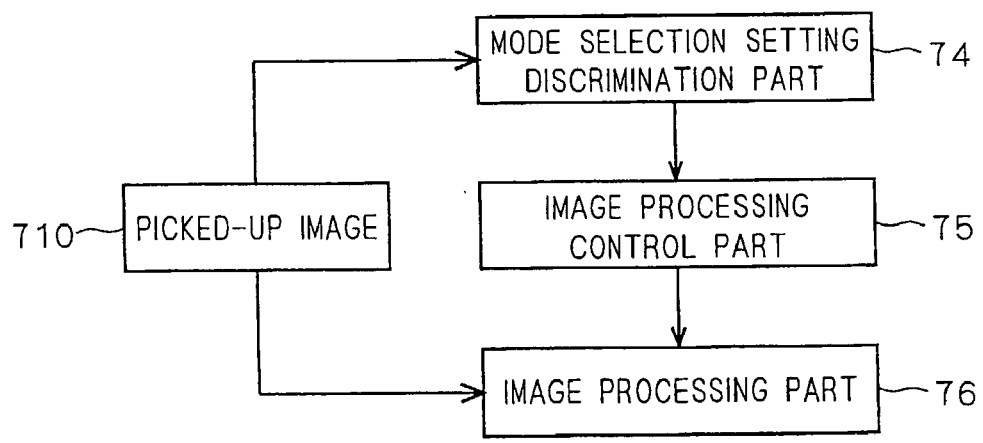
FIG. 21 is a block diagram that shows functions of a computer.

FIG. 21 is a block diagram that shows functions that are achieved by calculation processes of the CPU and the like of the computer 72 that are carried out in accordance with the above-mentioned programs. In FIG. 21, an image-processing control part 75 and an image-processing part 76 have the same functions as the image-processing control part 267 and the image-processing part 240.

Figure 22:
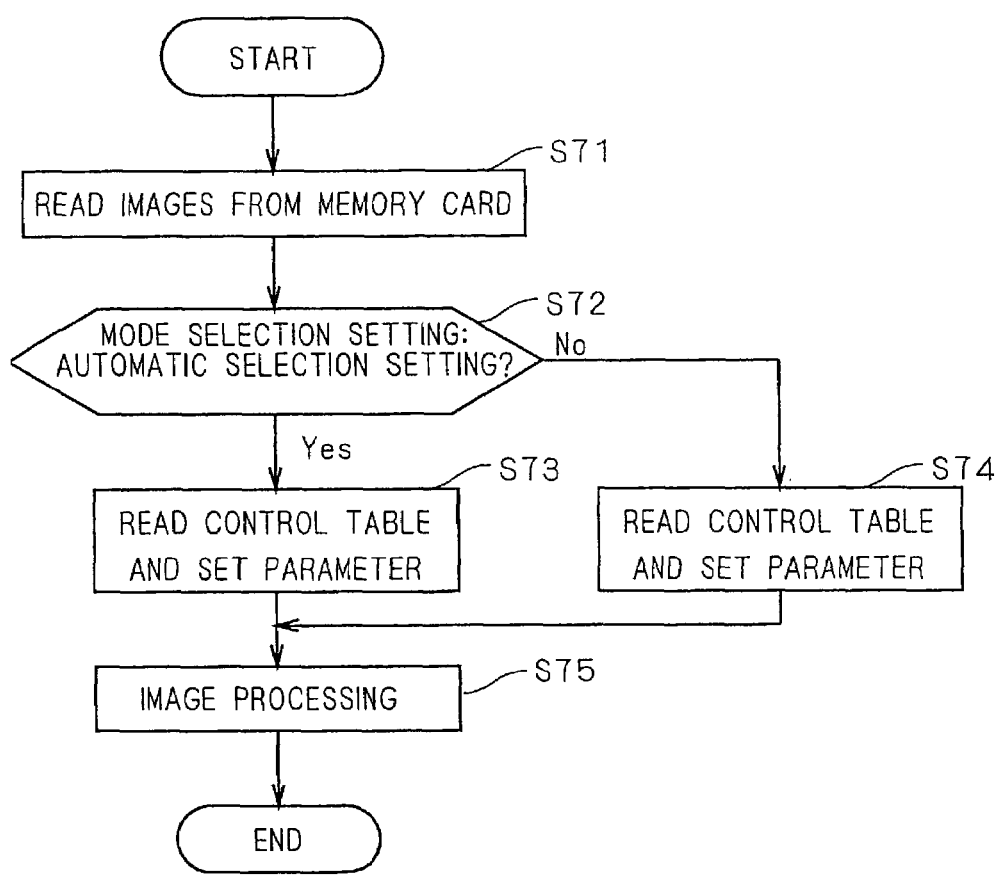
FIG. 22 is a block diagram that shows a flow of image processing in the computer.

FIG. 22 is a block diagram that shows a flow of image processes in the computer 72. The computer 72 carries out virtually the same processes as those processes related to image processes shown in FIG. 19.

First, a picked-up image 710 stored in the memory card is read out (step S71). Based upon the tag information of the picked-up image 710, a mode selection setting determination part 74 determines whether the mode selection setting at the time of the image-pickup process of the picked-up image 710 is the automatic selection setting or the manual selection setting. Then, it also obtains the image-pickup mode of the picked-up image 710 at the time of the image-pickup process, and inputs this to the image-processing control part 75 together with the determination information of the mode selection setting (step S72).

Referring to the control contents on the image-processing control table at the time of automatic selection setting in the case of the automatic selection setting, or referring to the control contents thereon at the time of manual selection setting in the case of the manual selection setting, the image-processing control part 75 sets image-processing control parameters (step S73, S74). In other words, it sets parameters relating to the image quality in a different manner depending on cases in which the mode selection setting is determined as the manual selection setting and in which the mode selection setting is determined as the automatic selection setting.

Then, under the control of the image-processing control part 75, an image processing is carried out on the picked-up image 710 in the image-processing part 76 based upon the image-processing control parameters thus set (step S75).

With the above-mentioned arrangement, the digital camera 1 in accordance with the above-mentioned preferred embodiment may be achieved as the image-processing system 7 constituted by the digital camera 71 and the computer 72. Thus, it becomes possible to reduce the processing amount im camera 71. Here, the image processes to be carried out by the computer 72 are not necessarily all the processes carried out by the image-processing part 240 in the above mentioned preferred embodiment, and one portion of processes may be carried out by the digital camera 71, while only the rest of the processes may be carried out by the computer 72.

While the invention has been shown and described in detail, the foregoing description is in all aspects illustrative and not restrictive. It is therefore understood that numerous other modifications and variations can be devised without departing from the scope of the invention.

What is claimed is:

1. An image-processing apparatus comprising:
   an image-pickup mode selection part which selects an image-pickup mode from a plurality of image-pickup modes;
   a first parameter setting part which sets a parameter relating to image quality of an image to a predetermined value in said image-pickup mode;
   a second parameter setting part which sets said parameter to a value different from said predetermined value in said image-pickup mode;
   a determining part which, with respect to a mode selection setting that allows said image-pickup mode selection part to select said image-pickup mode, determines whether the mode selection setting is a manual setting by a selection of the user or an automatic setting by a selection of said image-processing apparatus; and
   a parameter setting part selecting part which selects one of said first and second parameter setting parts for setting said parameter, in accordance with the results of discrimination of said determining part.

2. The image-processing apparatus according to claim 1, wherein said first and second parameter setting parts operate for each of said plurality of image-pickup modes.

3. The image-processing apparatus according to claim 2, wherein the value of said parameter, set by said first and second parameter setting parts, is varied depending on said plurality of image-pickup modes.

4. The image-processing apparatus according to claim 1, further comprising:
   a memory part which stores a reference value of said parameter and an optimal value of said parameter set in accordance with said image-pickup mode,
   wherein one of said first and second parameter setting parts, which is selected upon determination of said manual setting, sets said parameter to said optimal value, and
   one of said first and second parameter setting parts, which is selected upon determination of said automatic setting, sets said parameter to a value between said optimal value and said reference value.

5. The image-processing apparatus according to claim 1, further comprising:
   an image-pickup part for acquiring said image,
   wherein said parameter includes an exposure control parameter relating to exposure control at the time of an image-pickup process of said image.

6. The image-processing apparatus according to claim 5, wherein said exposure control parameter includes at least one of aperture value control, shutter speed control and flash light emission control.

7. The image-processing apparatus according to claim 1, wherein said parameter includes an image-processing control parameter relating to control of an image-process on an image.

8. The image-processing apparatus according to claim 7, wherein said image-process includes at least one of a white-balance correcting process, a γ correction process, a sharpness process, a coring process and a color correction process.

* * * * *